United States Patent
Weiss

(10) Patent No.: US 6,965,709 B1
(45) Date of Patent: Nov. 15, 2005

(54) FLUORESCENT OPTICAL POSITION SENSOR

(75) Inventor: Jonathan D. Weiss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/437,876

(22) Filed: May 14, 2003

(51) Int. Cl.$^7$ ............................................. G02B 6/00
(52) U.S. Cl. ..................................... 385/12; 250/361 R
(58) Field of Search .................... 385/12–13, 128–132; 356/73.1, 218; 250/483.1, 484.2, 485.1, 361 R

(56) References Cited

U.S. PATENT DOCUMENTS

| | | | | |
|---|---|---|---|---|
| 4,275,965 A | | 6/1981 | Snitzer et al. .............. 356/375 |
| 4,403,826 A | * | 9/1983 | Presby ....................... 385/141 |
| 4,488,773 A | | 12/1984 | Wagner ..................... 350/96.2 |
| 4,727,247 A | * | 2/1988 | Johnston ................. 250/361 R |
| 4,822,746 A | * | 4/1989 | Walt ........................... 436/528 |
| 4,870,292 A | | 9/1989 | Alpert et al. ............... 250/577 |
| 4,942,306 A | | 7/1990 | Colbourne .................. 250/577 |
| 4,994,682 A | | 2/1991 | Woodside .................... 250/577 |
| 5,005,005 A | | 4/1991 | Brossia et al. .............. 340/604 |
| 5,187,545 A | | 2/1993 | Allgauer ..................... 356/358 |
| 5,321,257 A | | 6/1994 | Danisch ................. 250/227.16 |
| 5,387,791 A | | 2/1995 | Weiss ..................... 250/227.14 |
| 5,419,636 A | | 5/1995 | Weiss ......................... 374/161 |
| 5,509,505 A | * | 4/1996 | Steger et al. ................ 187/394 |
| 5,585,915 A | * | 12/1996 | Kurosawa et al. .......... 356/218 |
| 5,880,475 A | * | 3/1999 | Oka et al. ................. 250/483.1 |
| 5,995,686 A | | 11/1999 | Hamburger et al. .......... 385/12 |
| 6,009,216 A | | 12/1999 | Pruett et al. .................. 385/12 |
| 6,172,377 B1 | | 1/2001 | Weiss .......................... 250/577 |
| 6,215,943 B1 | * | 4/2001 | Crotts et al. ................. 385/137 |
| 6,356,675 B1 | | 3/2002 | Weiss ........................... 385/12 |

FOREIGN PATENT DOCUMENTS

| | | | | |
|---|---|---|---|---|
| JP | 03-077026 | * | 4/1991 | ............. G01J 1/02 |
| JP | 06-300518 | * | 10/1994 | ........... G01B 11/00 |
| JP | 2000-114054 | * | 4/2000 | ........... H01F 27/00 |

OTHER PUBLICATIONS

Weiss, "*Fluorescent Optical Liquid-Level Sensor*", Aug. 2000, pp. 2198-2213.
Weiss, "*Impurity-Doped Fiber-Optic Shock Position Sensor*", pp. 1891-1896.

* cited by examiner

Primary Examiner—Frank G. Font
Assistant Examiner—Christopher M. Kalivoda
(74) Attorney, Agent, or Firm—Robert D. Watson

(57) ABSTRACT

A fluorescent optical position sensor and method of operation. A small excitation source side-pumps a localized region of fluorescence at an unknown position along a fluorescent waveguide. As the fluorescent light travels down the waveguide, the intensity of fluorescent light decreases due to absorption. By measuring with one (or two) photodetectors the attenuated intensity of fluorescent light emitted from one (or both) ends of the waveguide, the position of the excitation source relative to the waveguide can be determined by comparing the measured light intensity to a calibrated response curve or mathematical model. Alternatively, excitation light can be pumped into an end of the waveguide, which generates an exponentially-decaying continuous source of fluorescent light along the length of the waveguide. The position of a photodetector oriented to view the side of the waveguide can be uniquely determined by measuring the intensity of the fluorescent light emitted radially at that location.

24 Claims, 31 Drawing Sheets

ABSORPTION AND EMISSION SPECTRA OF CERTAIN FLUORESCERS

ATTENUATION VS WAVELENGTH OF THE UNDOPED FIBER

FLUORESCENT OPTICAL POSITION SENSOR

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to a method and apparatus for measuring the position of an object, and more specifically to a fluorescent optical position sensor that relies on the absorption and attenuation of fluorescent light carried inside of a fluorescent waveguide to determine the position of an object.

Non-electrical position sensors are desirable for use in hazardous environments, e.g., for measuring the liquid level in gasoline or jet fuel tanks. All-optical position sensors based on the use of fiber optics would be an attractive choice because they would introduce no electrical energy, be insensitive to electromagnetic interference, have few moving parts (if any), and could provide continuous measurements.

Large-scale rotary drilling for oil and gas, minerals, and water wells, have a need for measuring the depth of drill bits and pipe segments. Measuring the length of a cable played out is inaccurate because under heavy loads the cable stretches. An auxiliary cable under minimal tension has been used, but it can interfere with the drilling operation and is generally considered to be undesirable. Hence, a need exists for a long-range (greater than 10 meters), non-contact, simple, cheap, reliable, compact, non-electrical, and robust (able to withstand drilling mud and debris) device for measuring the height above ground of the "block" that supports the drill motor that turns the drill bit during drilling.

Against this background, the present invention was developed.

SUMMARY OF THE INVENTION

The present invention relates generally to a fluorescent optical position sensor and method of operation. In general, embodiments of the present invention comprise a fluorescent optical waveguide; means for generating a non-uniform distribution of fluorescent light inside of the waveguide along its length; and photodetector means for measuring fluorescent light emitted from the waveguide.

One embodiment of the sensor operates by using a small excitation source (e.g., laser, LED) to side-pump (excite) a localized region of fluorescence at an unknown position along a fluorescent optical waveguide. As the fluorescent light travels down the waveguide away from the source, the intensity of fluorescent light decreases due to absorption by the waveguide. By measuring with one (or two) photodetectors the attenuated intensity of fluorescent light emitted from one (or both) ends of the waveguide, the position of the excitation source relative to the waveguide can be determined by comparing the measured light intensity to a calibrated response curve or mathematical model. Any sensitivity of the sensor's accuracy to variations in pump source strength, optical coupling efficiency, and other factors can be minimized by taking the ratio of the light intensity signals measured by photodetectors located at both ends of the waveguide.

Another embodiment of the sensor operates by pumping excitation light into an end of the waveguide, which generates an exponentially-decaying continuous source of fluorescent light along the length of the waveguide. The position of a photodetector oriented to view the side of the waveguide can be uniquely determined by measuring the intensity of the fluorescent light emitted radially at that location.

Another embodiment of the sensor uses a waveguide that has a non-uniform variation in the concentration of doped fluorescers along its length (e.g., a linear gradient).

BRIEF DESCRIPTION OF THE DRAWINGS

The accompanying drawings, which are incorporated in and form part of the specification, illustrate various embodiments of the present invention and, together with the detailed description, serve to explain the principles of the invention.

DETAILED DESCRIPTION OF THE INVENTION

Figure 1:
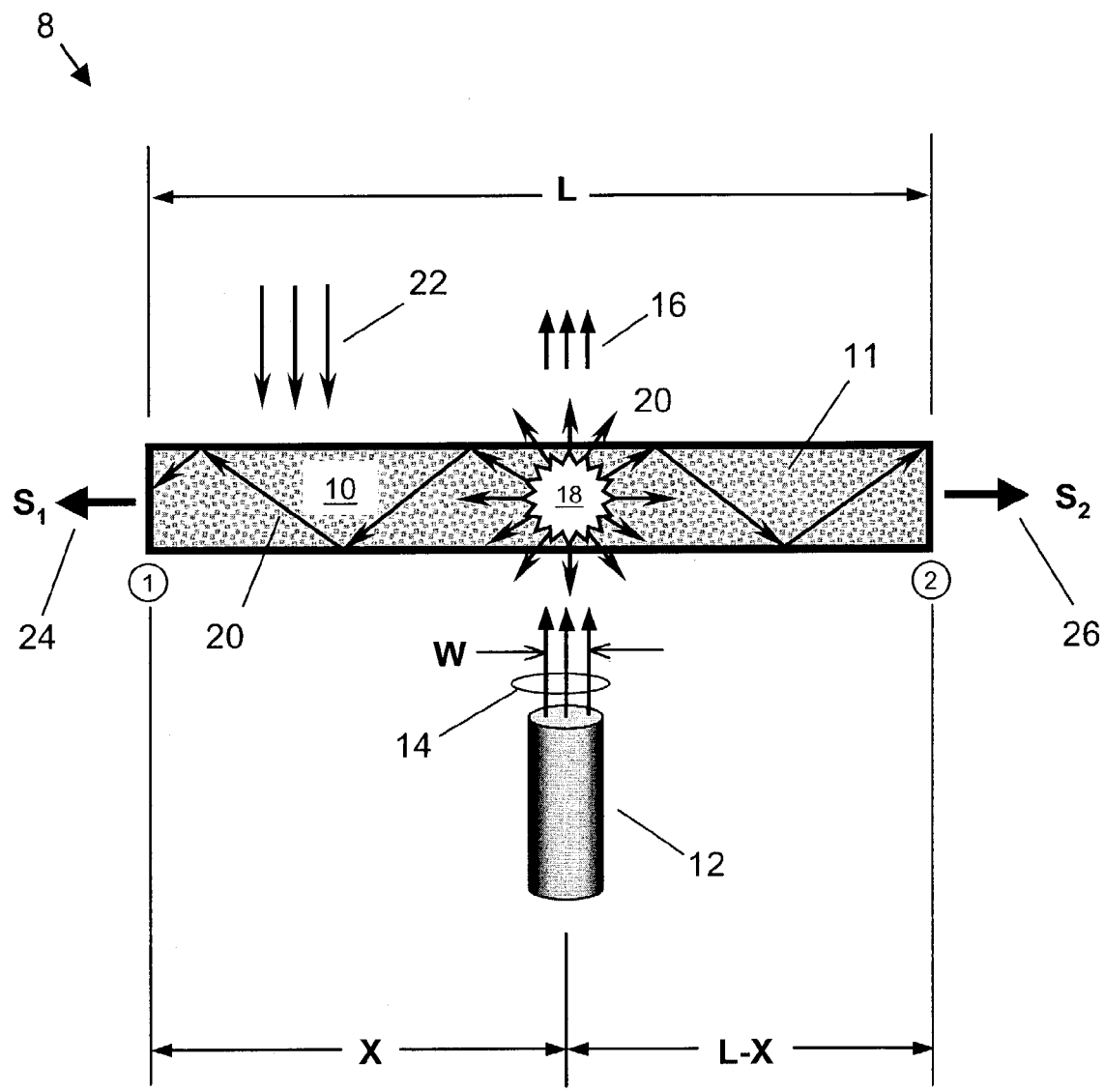
FIG. 1 illustrates a schematic view of an embodiment of a fluorescent optical position sensor, according to the present invention, that illustrates some of the fundamental optical phenomena.

It is to be understood that the invention is not limited in its application to the details of construction, materials used, and the arrangements of components set forth in the following description or illustrated in the drawings.

One embodiment of a fluorescent optical position sensor may comprise: a fluorescent optical waveguide; means for generating a non-uniform distribution of fluorescent light inside of the waveguide; and photodetector means for measuring fluorescent light emitted from the waveguide. The position sensor may further comprise processing means, in operative association with said photodetector means, for calculating the axial location, X, of a position, relative to the waveguide, based on analyzing an amount of fluorescent light measured by the photodetector means.

FIG. 1 illustrates a schematic view of an embodiment of a fluorescent optical position sensor 8, according to the present invention, that illustrates some of the fundamental optical phenomena. Optical waveguide 10, having a length, L, comprises an optically transmissive material (e.g., glass, clear plastic) that is uniformly doped with fluorescers, 11 (e.g., organic dyes). Localized excitation source 12 (i.e., "pump source") is positioned at an unknown axial distance, X, from the first end "1" of waveguide 10, and directs a beam of excitation light 14 having a wavelength, $\lambda_E$, and beam width, W, towards the side of waveguide 10, in a direction generally perpendicular to the waveguide's surface (i.e., the waveguide is "side-pumped"). The width, W, of excitation beam 14, is generally less than the length, L, of waveguide 10 (i.e., W<L). Alternatively, W can be very much less than L (i.e., W<<L). Some of excitation light 14 may pass through waveguide 10 without interaction, producing a beam of transmitted excitation light 16 on the opposite side of waveguide 10. Some of the excitation light 14 may also be reflected away by the surface of waveguide 10, depending on the angle of incidence, reflectivity, etc. Optionally, a back reflector (not shown) may be positioned behind waveguide 10 to reflect transmitted excitation light 16 back into waveguide 10 to stimulate additional fluorescence.

Some of the excitation light 14 is absorbed by the doped fluorescers 11, which become excited and are stimulated to re-emit light isotropically at a longer wavelength, $\lambda_F$, from a localized region 18 of fluorescence (i.e., $\lambda_F > \lambda_E$), having a width, W. Some of the fluorescent light 20 is emitted from localized region 18 at too large an angle with respect to the axis of waveguide 10 to be internally guided and, hence, escapes. The remaining fluorescent light 20 is trapped by internal reflections and is guided (i.e., carried, transmitted, travels) down waveguide 10 away from localized region 18. If the width, W, of localized fluorescent region 18 is very much smaller than the length, L, of waveguide 10 (i.e., W<<L), then the source of fluorescent light 20 can be effectively considered to approximate a point source of fluorescence.

As fluorescent light 20 travels down waveguide 10 away from localized region (i.e., source) 18, its intensity is reduced due to absorption by the waveguide, and, possibly, scattering out of the waveguide. Hence, by the time that fluorescent light 20 has reached either end "1" or "2" of waveguide 10, its intensity has been attenuated by an amount that depends uniquely on the distance from fluorescent region 18. Additionally, depending on the surface conditions of waveguide 10 (e.g., scratched, micro-bent, etc.), the refractive index of the surrounding media (air, water, etc.), and the amount of light scattered from scattering sites within the waveguide, some of fluorescent light 20 may escape and be lost as it travels down waveguide 10, causing additional attenuation of its intensity. On the other hand, any ambient light 22 incident upon waveguide 10 may be absorbed and generate additional fluorescent light, which would also be guided along its length.

The intensity of light emitted from either end "1" or "2" of waveguide 10 can be measured by a suitable photodetector (not shown), such as a photodiode, CCD element, etc., as is well known in the art. Emitted light 24, having an intensity, $S_1$, exits from the first end "1" of waveguide 10. Emitted light 26, having an intensity, $S_2$, exits from the opposite end "2" of waveguide 10.

The intensity, $S_1$, of emitted light 24 comprises an attenuated amount of fluorescent light 20, whose intensity has been reduced by internal absorption along the length, X, of waveguide 10. At the opposite end, the intensity, $S_2$, of emitted light 26 comprises an attenuated amount of fluorescent light 20, whose intensity has been reduced by internal absorption along the complementary length, L–X, of waveguide 10.

Excitation source 12 may be a continuous, steady-state source, or it may be a modulated or pulsed source, or any combination thereof.

Figure 2A:
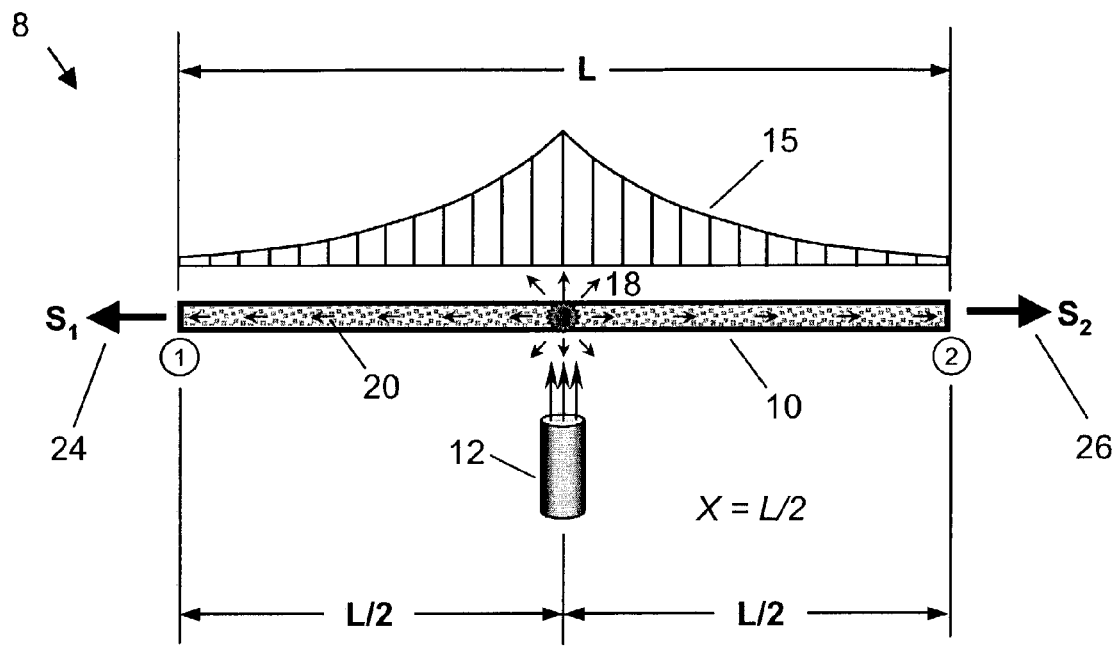
FIG. 2A illustrates a schematic layout of another embodiment of an optical position sensor, according to the present invention.

FIG. 2A illustrates a schematic layout of another embodiment of an optical position sensor 8, according to the present invention. Here, the axial position, X, of side-pumped excitation source 12 is located in the middle of waveguide 10 (i.e., X=L/2). Since fluorescence light 20 is emitted isotropically from localized region 18, equal power travels toward one end of waveguide 10 as the other. Assuming that waveguide 10 is uniformly doped with fluorescers, and that the absorption properties are uniform along it's length, then the intensities of both emitted light beams 24 and 26 will be approximately equal, i.e., $S_1=S_2$. Curve 15 schematically illustrates an exponential decay in the intensity of fluorescent light 20 within waveguide 10 that decays in both directions away from source 18 of fluorescent light 20.

Figure 2B:
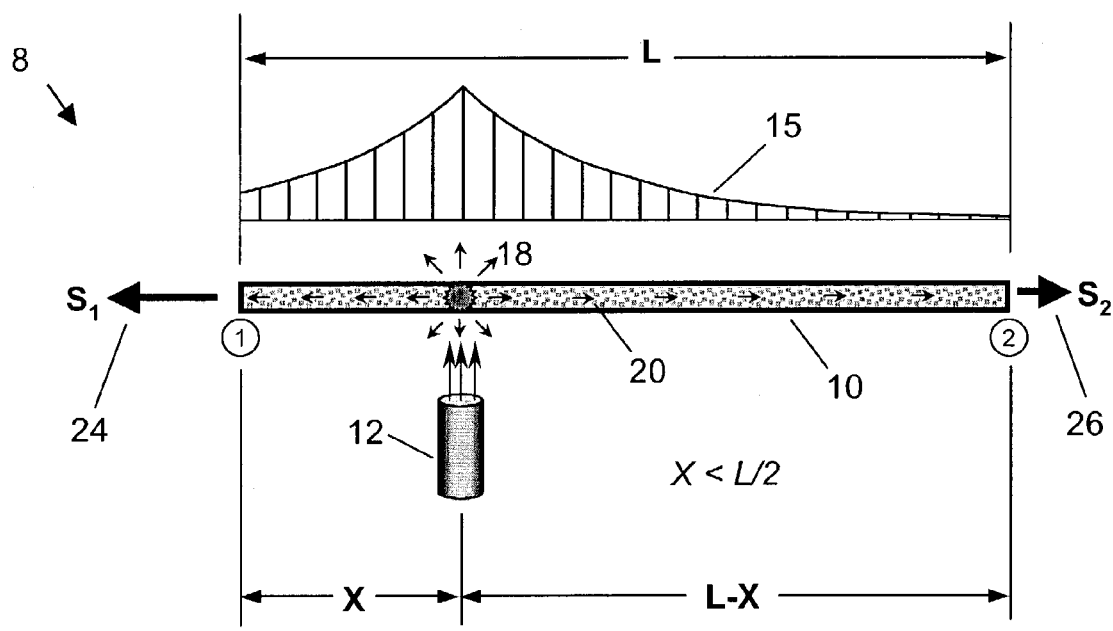
FIG. 2B illustrates a schematic layout of another embodiment of an optical position sensor, according to the present invention.

FIG. 2B illustrates a schematic layout of another embodiment of an optical position sensor 8, according to the present invention. Here, the excitation source 12 is located closer to the first end "1" of waveguide 10 (i.e., X<L/2). Assuming that waveguide 10 is uniformly doped with fluorescers, and that the absorption properties are uniform along it's length, then, the intensity of light emitted from the second end "2" will be less than the intensity of light emitted from the first end "1", i.e., $S_2<S_2$. This is because more of the fluorescent light 20 emitted from region 18 is absorbed along the longer distance, (L–X), of waveguide 10, as compared a lesser amount of absorption occurring along the shorter distance, X, in the opposite direction.

Conversely, if the amount of optical absorption in waveguide 10 is negligible, then both output signals, $S_1$ and $S_2$, would have substantially equal intensities, regardless of where excitation source 12 is located.

Assuming the optical absorption properties (particularly, in the vicinity of the wavelength, $\lambda_F$, of fluorescent light 20) are uniform along the entire length of waveguide 10 (i.e., by having uniformly doped fluorescers), then the following equations can be used to describe a simple relationship between the output intensities ($S_1$ and $S_2$), and unknown position, X, of excitation source 12.

$$S_1 = ke^{-\alpha X} \quad (1)$$

$$S_2 = ke^{-\alpha(L-X)} \quad (2)$$

$$S_2/S_2 = e^{\alpha L}e^{-2\alpha X} \quad (3)$$

where $\alpha$=0.23 B, and B=Fiber Attenuation Coefficient (in db/meter).

As an example, assume that the fiber attenuation coefficient, B, equals 0.3 db/meter, and the waveguide is 30 meters long (L=30), then the signal ratio, $S_1/S_2$=7.9 when the excitation source is positioned at the left end (X=0). When the excitation source is positioned at the far right end (X=30 meters), then $S_1/S_2$=0.13. When the excitation source is positioned exactly at the middle (X=15 meters), then $S_1/S_2$=1.

Solving for X from eq. (3), we get equation (4):

$$X = \frac{L}{2} - \frac{1}{2\alpha}\ln(S_1/S_2) \quad (4)$$

This simple exponential response is called "single-ended" because the origin of the X-coordinate system is located at one end of the waveguide. On the other hand, a clear symmetry exists with respect to the center of the waveguide. Consequently, if it is desired that the position of excitation source 12 should be measured from the center of the waveguide, then equations (1)–(3) can be appropriately rewritten in a "centered" coordinate system.

In the previous embodiments shown in FIGS. 1, 2A, and 2B, the coordinate system used is a one-dimensional, Cartesian coordinate system. However, the method and apparatus of the present invention can be generalized to be used in a one-dimensional curvilinear coordinate system, such as illustrated schematically in FIG. 3.

Figure 3:
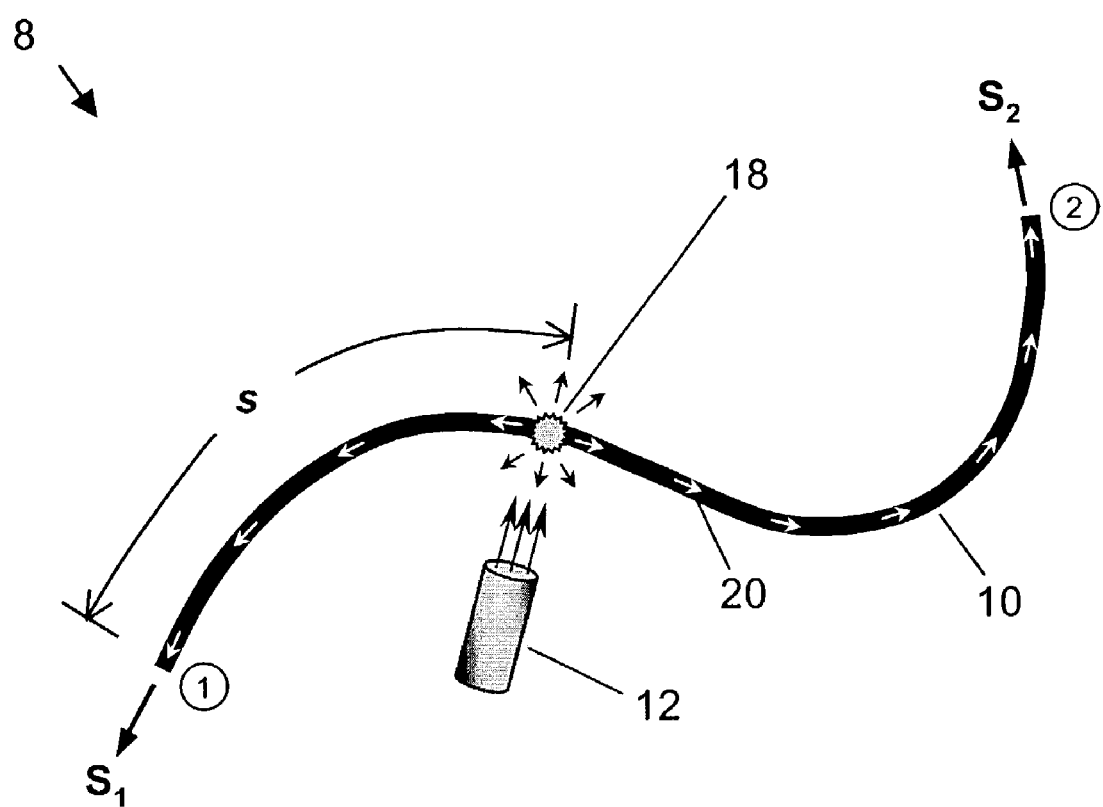
FIG. 3 shows a schematic layout of another embodiment of an optical position sensor, according to the present invention.

FIG. 3 shows a schematic layout of another embodiment of an optical position sensor 8, according to the present invention. Here, fluorescent waveguide 10 is curved in one or more directions. The position of excitation source 12 can be defined in terms of a one-dimensional, curvilinear coordinate, s, which closely follows the path of the curved shape of waveguide 10. Hence, the curvilinear coordinate variable, s, is the path length from one end of waveguide to the location of excitation source 12. In a "single-ended" system, equations (1)–(3) could be used equally well for the curved waveguide 10 shown in FIG. 3 by simply substituting the curvilinear coordinate variable, s, for the linear Cartesian coordinate variable, X. Note that the shape of waveguide 10 is drawn as being confined to the plane in FIG. 3, however, it is not necessary to confine a curved waveguide 10 to lay on a single plane. Waveguide 10 may be curved in any three-dimensional space, in a completely general way, and still be characterized by a one-dimensional, curvilinear coordinate, s, which closely follows the path of the curved shape of waveguide 10.

Referring still to FIGS. 1–3, the shape of waveguide 10 may comprise a long, thin fiber (with or without one or more claddings), or may comprise a rod, slab, cylinder, rectangle, other solid shape, straight or curved shape, that is relatively long and narrow and guides light along the long axis of the body from one end to the other.

It is not a requirement that the distribution of fluorescent material or optical absorption properties be uniform along the length of waveguide 10 for the method and apparatus of the present invention. In these cases, a calibration curve can be generated that provides a unique relationship between the position of excitation source 12 and the intensity of output signals, $S_1$ and $S_2$, and/or the ratio of $S_1/S_2$. Note that when referring to the ratio of output signals, $S_1/S_2$ we also intend to include equal consideration of the inverse ratio, i.e., $S_2/S_1$ in the discussion of the method and apparatus of the present invention. However, if the distributions of fluorescent material and optical absorption properties are reasonably uniform along the length, then equations (1)–(3) can be used to provide a reasonably accurate prediction of the sensor's response.

In various embodiments of the present invention, waveguide 10 may comprise one or more optical fibers (i.e., fiber optics). The general properties, materials, and construction of optical fibers are well known and will not be discussed further in detail. However, to achieve a desired measurement range (e.g., inches, feet, meters, kilometers), proper selection of the Fiber Attenuation Coefficient, B, (also known as the Extinction Coefficient or Absorption Coefficient) is an important aspect of the sensor's design. In general, the absorption coefficient (dB/meter) depends on the fluorescence wavelength $\lambda_F$ and the base material of the fiber. If the extinction coefficient is too high for a given fiber length, L, the signal at one or both ends could be too low. Conversely, if the extinction coefficient is too low, then the output signals at both ends will be large, and will not change much as excitation source 12 moves along the fiber optic waveguide 10.

Plastic optical fibers generally have high absorption coefficients, and would be appropriate for ranges of less than about 100 feet, while glass fibers would likely be required for lengths greater than about 100 feet.

Referring to FIG. 1, it is possible that incident ambient light 22 (e.g., sunlight, fluorescent light, incandescent light, other light sources) may be absorbed by waveguide 10 and generate additional fluorescence that could interfere with the sensor's response by increasing the intensity of output signals $S_1$ and $S_2$. However, if the ambient light is uniform along the length of waveguide 10, then both of the signals $S_1$ and $S_2$ will be affected by approximately the same amount. Additionally, a calibrated response curve may be used to account for the effect of ambient light.

Alternatively, any undesired signal from fluorescence induced by ambient light 22 may be effectively eliminated by modulating the output of excitation source 12 at a high frequency, e.g. greater than 10 KHz, and then electrically or digitally filtering out all signals that are below this frequency (e.g., sunlight is DC, and fluorescent lighting oscillates at 60–120 Hz).

Figure 4:
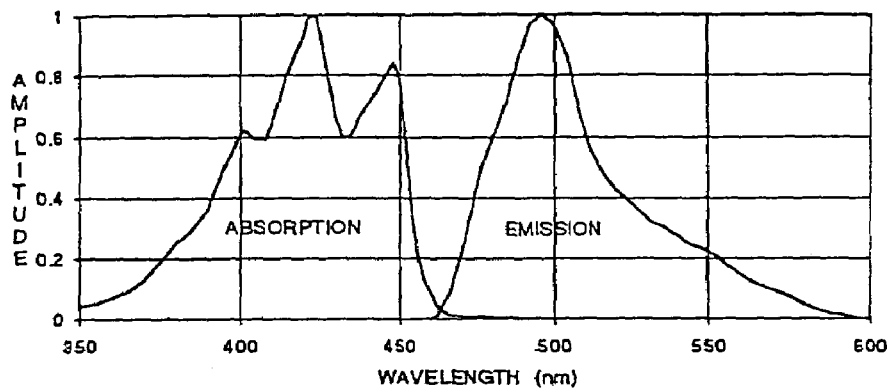
FIG. 4 shows the absorption (i.e., excitation, pump) spectrum and emission (fluorescence) spectrum of a polystyrene optical fiber doped with proprietary organic fluorescers, manufactured by Saint Gobain Industrial Ceramics (formerly, Bicron).

FIG. 4 shows the absorption (i.e., excitation, pump) spectrum and emission (fluorescence) spectrum of a polystyrene optical fiber doped with proprietary organic fluorescers, manufactured by Saint Gobain Industrial Ceramics, Inc. (formerly, Bicron, Inc.). We see that the peak excitation wavelength $\lambda_E$ is in the vicinity of about 425 nm (blue), and that the peak fluorescence wavelength $\lambda_F$ is longer, in the vicinity of about 500 nm (green). Since the absorption (excitation) and emission (fluorescence) spectra do not overlap significantly, this means that the localized source of fluorescent light 20 (generated within localized region 18) will not excite significant amounts of additional secondary fluorescence in areas outside of localized region 18, as fluorescent light 20 travels down waveguide 10. However, if secondary fluorescence is generated, then the effective absorption of the primary fluorescence would increase because the secondary fluorescence is also isotropic. Thus, much of the secondary fluorescence is not guided by the waveguide and does not reach either end.

Figure 5:
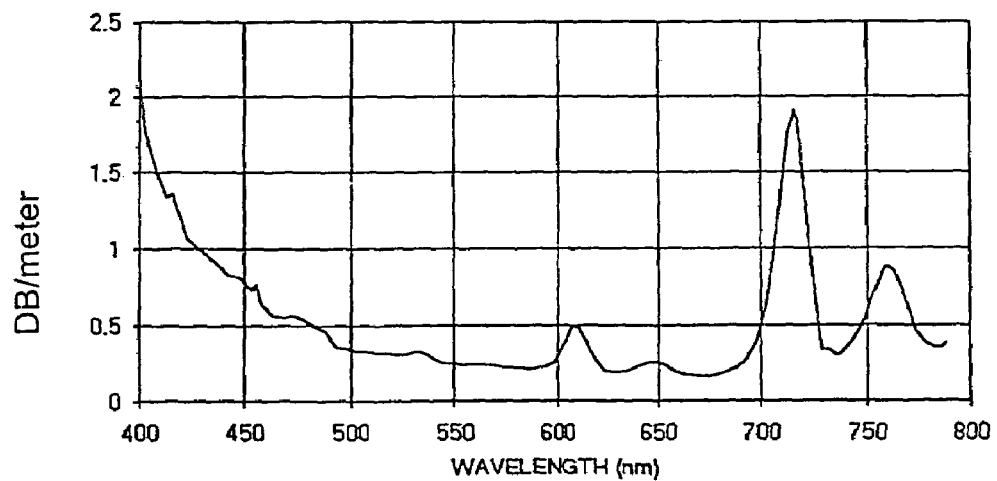
FIG. 5 shows the spectral dependence of the attenuation properties (i.e., fiber extinction coefficient, B, in dB/meter) of an undoped (i.e., non-fluorescent) polystyrene optical fiber.

FIG. 5 shows the spectral dependence of the attenuation properties (i.e., fiber extinction coefficient, B, in dB/meter) of an undoped (i.e., non-fluorescent) polystyrene optical fiber. In the wavelength range of 460 nm to 600 nm (covering the spectral range for fluorescent emission shown in FIG. 4, for example), the attenuation coefficient is reasonably constant at about 0.3 db/meter. The presence of organic flourescers added (i.e., doped) to the base polystyrene fiber does not affect the absorption coefficient, since the absorption (excitation) spectrum and emission (fluorescence) spectrum do not overlap significantly (as can be seen in FIG. 4).

Other plastic optical fibers, e.g., comprising polystyrene, PMMA, or acrylic plastic, can be doped with fluorescent material or organic fluorescent dyes to produce a wide selection of substantially monochromatic colors, including red, green, blue, orange, and amber, which can be excited by shorter wavelengths, including ultraviolet to blue light. Other materials that fluoresce at even longer wavelengths, such as the near and far infrared (IR) spectrum may be used.

The present invention also contemplates the use of scintillating fibers for waveguide 10, which emit light in the visible range when exposed to high energy particles (X-rays, neutrons, gammas, energetic electrons, ions, etc.). The present invention also contemplates the use of glass fibers for waveguide 10 that can be doped with rare-earth elements, such as neodymium and/or erbium, which fluoresce in the neighborhood of about 1060 nm (which is closer to the peak response of a silicon photodetector) in response to optical pumping at shorter wavelengths, e.g., 810 nm.

Excitation source 12, which generates excitation beam 14, may comprise a variety of sources, including lasers, LED's, Vertical Cavity Surface Emitting Lasers (VCSEL's), monochromatic incoherent light sources (e.g., tungsten, mercury, or sodium vapor), incandescent light sources, sunlight, ultraviolet and microwave sources. Excitation source 12 may also comprise nuclear sources, such as radioactive materials-producing alpha, beta, and gamma rays; neutrons; X-ray sources, etc. Combinations of any of the above sources may be used.

Excitation source 12 may be operated in a variety of modes, including: continuously (DC), modulated at a constant frequency or constant amplitude, pulsed at a constant or variable rate, or modulated at a variable frequency and amplitude, or any combination of the above.

Excitation beam 14 may impinge on the side of waveguide 10 at any angle, from normal (i.e., perpendicular) incidence down to a shallow, grazing angle, depending on the application.

Figure 6:
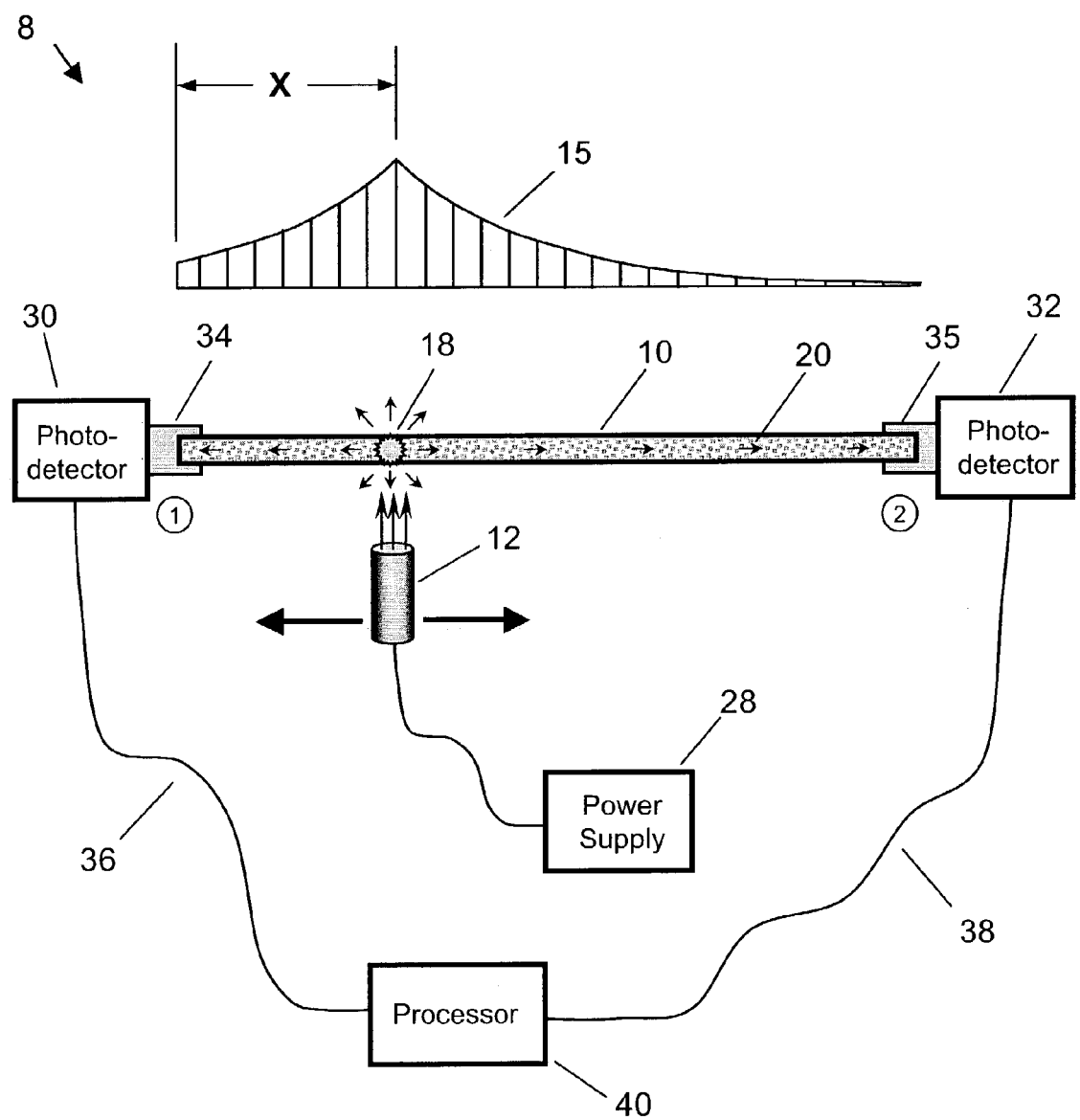
FIG. 6 shows a schematic layout of another embodiment of an optical position sensor, according to the present invention.

FIG. 6 shows a schematic layout of another embodiment of an optical position sensor 8, according to the present invention. Sensor 8 comprises fiber optic 10 with photodetectors 30 and 32 attached to the ends "1" and "2" of fiber optic 10 via optical couplers 34 and 35, respectively. Photodetectors 30, 32 measure the intensity $S_1$ and $S_2$ of light emitted from ends "1" and "2" of fiber optic 10, respectively, and may comprise photodiodes, CCD elements, silicon detectors, etc., as is well known in the art. Power supply 28 provides power to excitation source 12. The electrical output from photodetectors 30 and 32 is connected to processor 40 via electrical cables 36 and 38, respectively. Alternatively (not shown), the output signals may be transmitted wirelessly to processor 40. Processor 40 may comprise analog or computer digital processing means, memory means, and display means, for calculating the position, X, of excitation source 12 relative to the first end "1" of fiber optic 10, by using the measured intensity values $S_1$ and $S_2$. Curve 15 schematically illustrates an exponential decay in the intensity of fluorescent light 20 within waveguide 10 that decays in both directions away from source 18 of fluorescent light 20.

It should be clear that any sort of object may be attached to excitation source 12 in such a manner that the position of the object, relative to the coordinate system of the optical waveguide 10, may be determined by measuring the position of the attached excitation source 12 in the manner presented herein using sensor 8.

Any variety of mechanical motion control devices (not shown), including sliding or rolling bearings, tracks, etc.

may be used to confine the motion of excitation source 12 to travel smoothly and continuously along the path defined by the shape of waveguide 10, including straight and curved paths. Such a motion control device may also be used to hold excitation source 12 at a constant distance (spacing) away from the surface of waveguide 10, and at a constant angle of incidence (e.g., perpendicular). However, it is not required to hold excitation source 12 at a constant distance (spacing) away from the surface of waveguide 10, or at a constant angle of incidence (e.g., perpendicular), since the ratio of the output signals, $S_1/S_2$, is independent of the degree of coupling of excitation light into the fiber, as will be discussed shortly.

Figure 7:
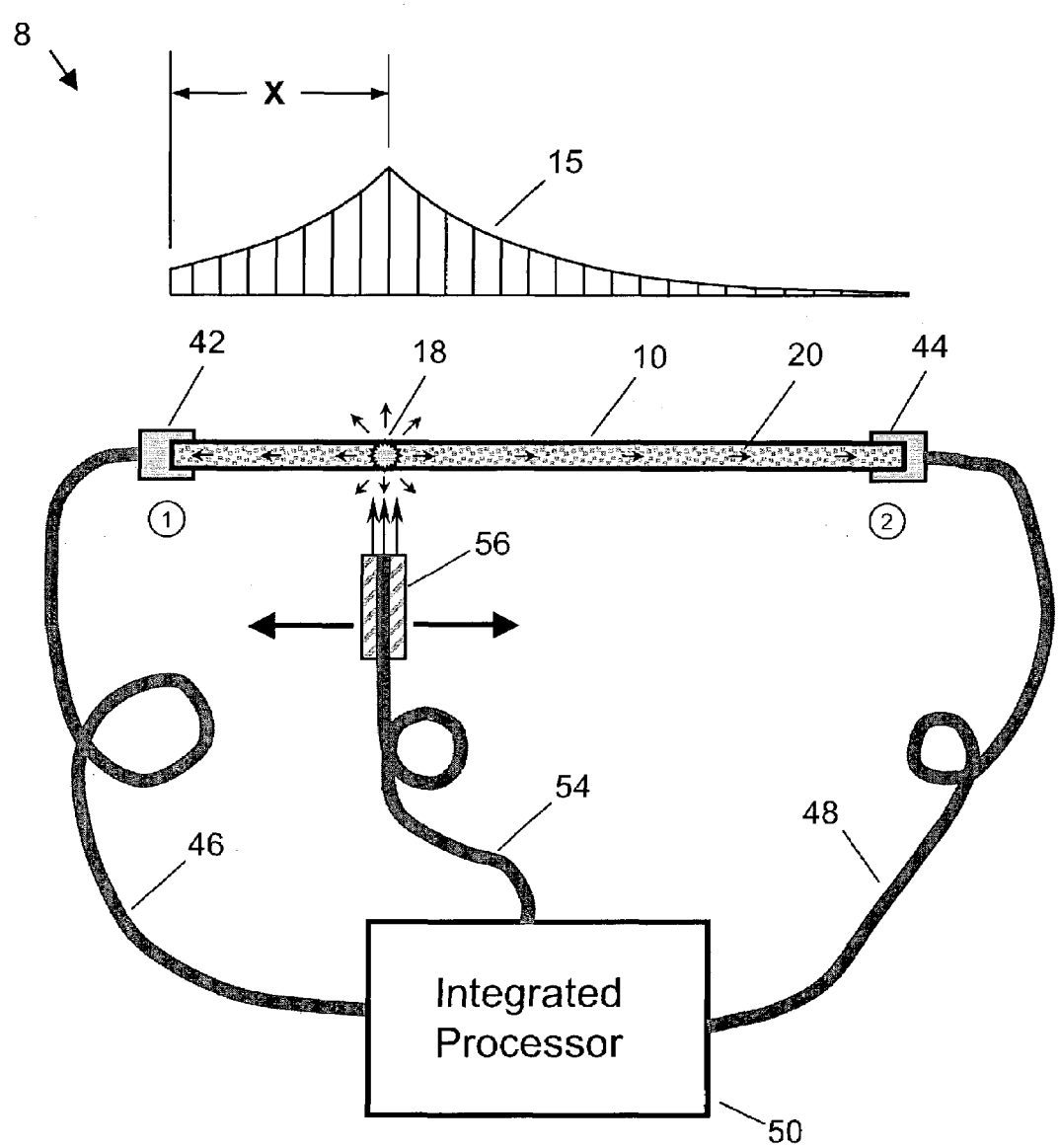
FIG. 7 shows a schematic layout of another embodiment of an optical position sensor, according to the present invention.

FIG. 7 shows a schematic layout of another embodiment of an optical position sensor 8, according to the present invention. Sensor 8 comprises fiber optic 10 with optical couplers 42 and 44 attached to the ends "1" and "2" of fiber optic 10, respectively. Clear, low-loss, non-absorbing optical fibers 46 and 48 are attached to couplers 42 and 44, respectively, which transmit light emitted from ends "1" and "2" to photodetectors (not shown), contained within housing 50. Housing 50 also contains a processor and a light source. A clear, low-loss, non-absorbing optical fiber 54 may be used to guide light from the light source located inside of housing 50 to the other end of fiber 54, which is held by support fixture 56 in close proximity to fiber optic waveguide 10, and directly illuminates (i.e., side-pumps) fiber optic 10. Support fixture 56 may comprise an annular, ring-like structure (not shown) that surrounds fiber optic 10. Housing 50 may include a power source (including batteries) and other electronic components (not shown) for modulating the excitation source, amplifying and filtering the photodetector output, displaying, and storing the data and results, etc. In this embodiment (FIG. 7), all of the Electrical components are contained within housing 50, which can be a shielded housing. Only optical sensor components are located outside of housing 50, which allows use in explosive environments. Note, however, that excitation source 12 can be located farther away than shown in FIG. 7, just so long as enough light reaches waveguide 10 to generate a sufficiently large localized source of fluorescence 18. This could be accomplished by collimation of the excitation source, or by the use of several fluorescent optical fibers bundled together to collect any divergent excitation light.

Previously, we have discussed how excitation source 12 (or support fixture 56 in FIG. 7), moves along the length of waveguide 10.

In other embodiments of the present invention, it is possible for waveguide 10 to move relative to a stationary excitation source 12, since it is the relative motion between waveguide 10 and source 12 that is measured by sensor 8.

In equations (1) and (2), the proportionality constant "k" that determines the intensity of output signal $S_1$ and $S_2$ depends on many different factors, including the concentration (i.e., density) of fluorescers, the electronic gain factors, the photodetector's sensitivity, the optical coupling efficiency from the waveguide to the detector, the strength of the pump source (i.e., excitation source 12), and the fraction of excitation power entering waveguide 10. Some of these factors may vary over time, such as the pump source strength as it ages, or the coupling efficiency of the pump power into the waveguide if the lateral separation distance varies. However, barring signal-to-noise considerations, these generally unavoidable variations will not affect the ratio of the output signals, $S_1/S_2$, since the ratio of signals is independent of the constant "k", as can be seen from equation (3).

In another embodiment of the present invention, it is also possible to operate position sensor 8 using a single photodetector to measure the light emitted from only one end of waveguide 10 (either $S_1$ or $S_2$, but not both). From equations (1) and (2), we see that use of a single photodetector requires knowledge of the constant "k" to achieve an absolute measurement of the source's position. Alternatively, a calibrated response curve for $S_1$ (and/or $S_2$) may be used to overcome a lack of a measurement for constant "k". Also, a calibrated response curve likely provides a more accurate measurement, since equations (1)–(3) only approximate the response of the system. Having the ability to measure distance with a single photodetector would be useful if a second photodetector coupled to the other end of waveguide 10 fails or is defective.

In another embodiment of the present invention, a single photodetector may be used for measuring a change in the position of source 12 relative to a previous position, i.e., $\Delta X$. If a first position, X, provides an output signal of $S_1$, and a second position, X', provides an output signal of $S_1'$, then equation (5) can be used to calculate the relative change in position, $\Delta X$, as:

$$S_1/S_1' = e^{\alpha \Delta X} \tag{5}$$

where $\Delta X = X - X'$. Solving for $\Delta X$, we get:

$$\Delta X = \frac{1}{\alpha} \ln(S_1/S_1') \tag{6}$$

where $\alpha = 0.23$ B, and B=Fiber Attenuation Coefficient (in db/meter). Here, we see that the constant "k" and the waveguide length "L" disappears from equations (5) and (6).

Figure 8:
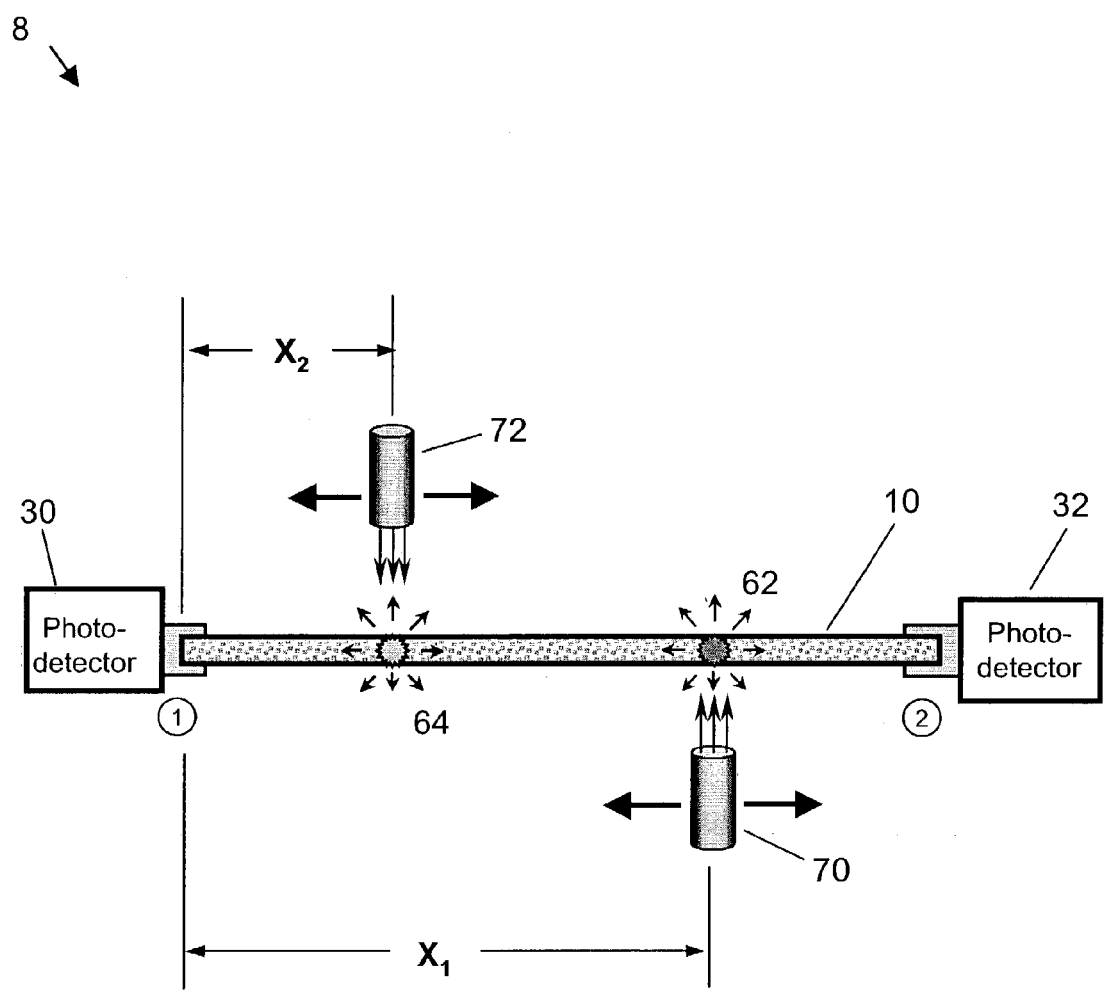
FIG. 8 shows a schematic layout of another embodiment of an optical position sensor, according to the present invention.

FIG. 8 shows a schematic layout of another embodiment of an optical position sensor 8, according to the present invention. Sensor 8 comprises a fluorescent waveguide 10 with photodetectors 30, 32 coupled to ends "1" and "2" of waveguide 10. A pair of side-pumped excitation sources 70 and 72 are shown, with source 70 being located at $X_1$ and source being located at $X_2$. Each source independently creates a localized region of fluorescence, 62, 64 and each source can move independently of each other relative to waveguide 10. The two sources 70 and 72 can be located on opposite sides of waveguide 10, so that they don't interfere with each other when moving. Alternatively, if their travel is limited, then they could be placed on the same side of waveguide 10. The individual contributions to the total photodetector response $S_1$ or $S_2$ can be distinguished from each other (and from ambient lighting, if any) by modulating the individual sources 70, 72 at different frequencies, $f_1$ and $f_2$. This approach can be generalized for any number of individual sources, by using a different modulation frequency for each excitation source.

Figure 9:
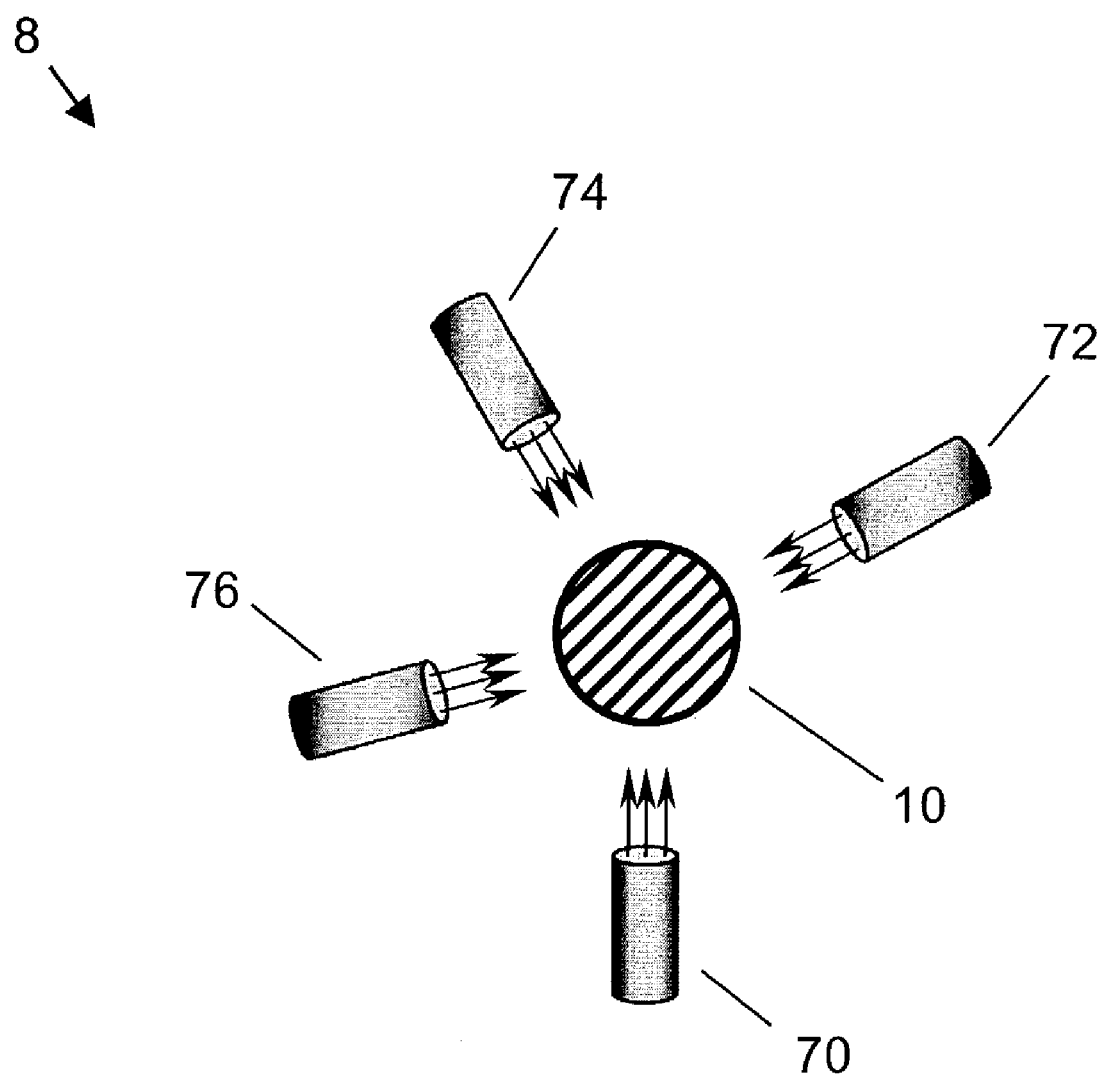
FIG. 9 shows a schematic cross-section end view of another embodiment of an optical position sensor, according to the present invention.

FIG. 9 shows a schematic cross-section end view of another embodiment of an optical position sensor 8, according to the present invention. In this cross-section view of waveguide 10, four individual, side-pumped excitation sources 70, 72, 74 and 76 are shown arrayed around waveguide 10 at different circumferential positions, and possibly different axial positions. Each source independently creates a localized region of fluorescence, and each source can be independently moved relative to waveguide 10. The individual contributions to the total photodetector response from the plurality of sources can be distinguished from each other (and from ambient lighting, if any) by modulating the individual sources 70, 72, 74 and 76 at different frequencies, $f_1$, $f_2$, $f_3$, and $f_4$. The method can be generalized for any number of individual sources, by using a different modulation frequency for each source.

Figure 10A:
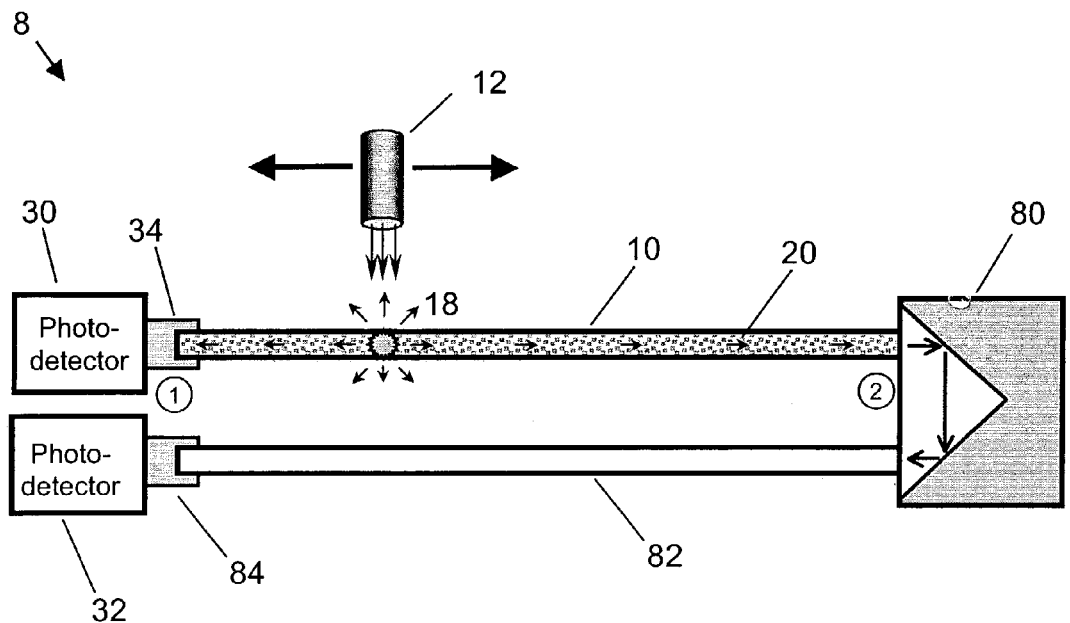
FIG. 10A shows a schematic layout of another embodiment of an optical position sensor, according to the present invention.

FIG. 10A shows a schematic layout of another embodiment of an optical position sensor 8, according to the present invention. Photodetector 30 is attached via coupling 34 to end "1" of fiber optic 10. Reflector 80 is attached to the other end "2" of fiber optic 10. The distal end of a low-loss return fiber 82 is attached to reflector 80, and the proximal end of return fiber 82 is coupled to a second photodetector 32 via second coupling 84. Reflector 80 redirects the light which exits from end "2" by 180 degrees, so that it can be carried by return fiber 82, in a direction substantially parallel to fluorescent waveguide 10, back to photodetector 32, which can be located adjacent to the photodetector 30. Locating both photodetectors 30, 32 at a common end of waveguide 10 may be useful for certain applications, such as drilling and drill pipe installation, since both photodetectors 30, 32 would be readily accessible for maintenance, etc. Additionally, both photodetectors 30, 32 could be integrated into a single housing (not shown).

Figure 10B:
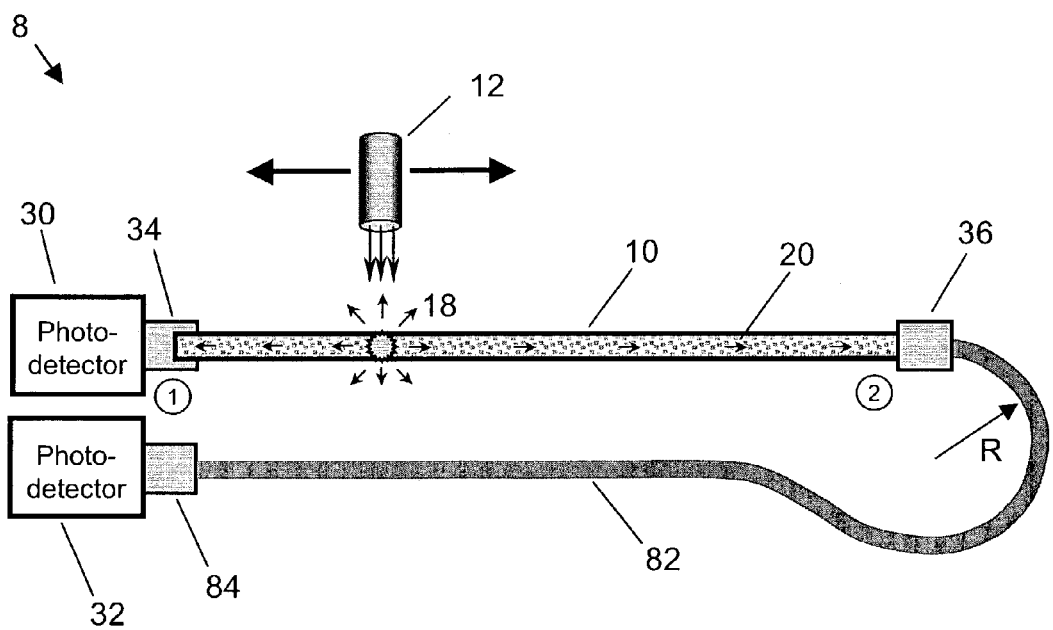
FIG. 10B shows a schematic layout of another embodiment of an optical position sensor, according to the present invention.

FIG. 10B shows a schematic layout of another embodiment of an optical position sensor 8, according to the present invention. Photodetector 30 is attached via coupling 34 to end "1" of fiber optic 10. The distal end of a low-loss return optical fiber 82 is attached to the opposite end "2" of fiber optic 10 via second coupling 36. The proximal end of low-loss return optical fiber 82 is coupled to a second photodetector 32 via third coupling 84. The light which exits from end "2" is carried by low-loss return optical fiber 82 in a direction substantially parallel to fluorescent fiber optic 10 back to photodetector 32, which can be located adjacent to the first photodetector 30. A sufficiently large bend radius, R, should be used, however, for low-loss optical return fiber 82.

Figure 11:
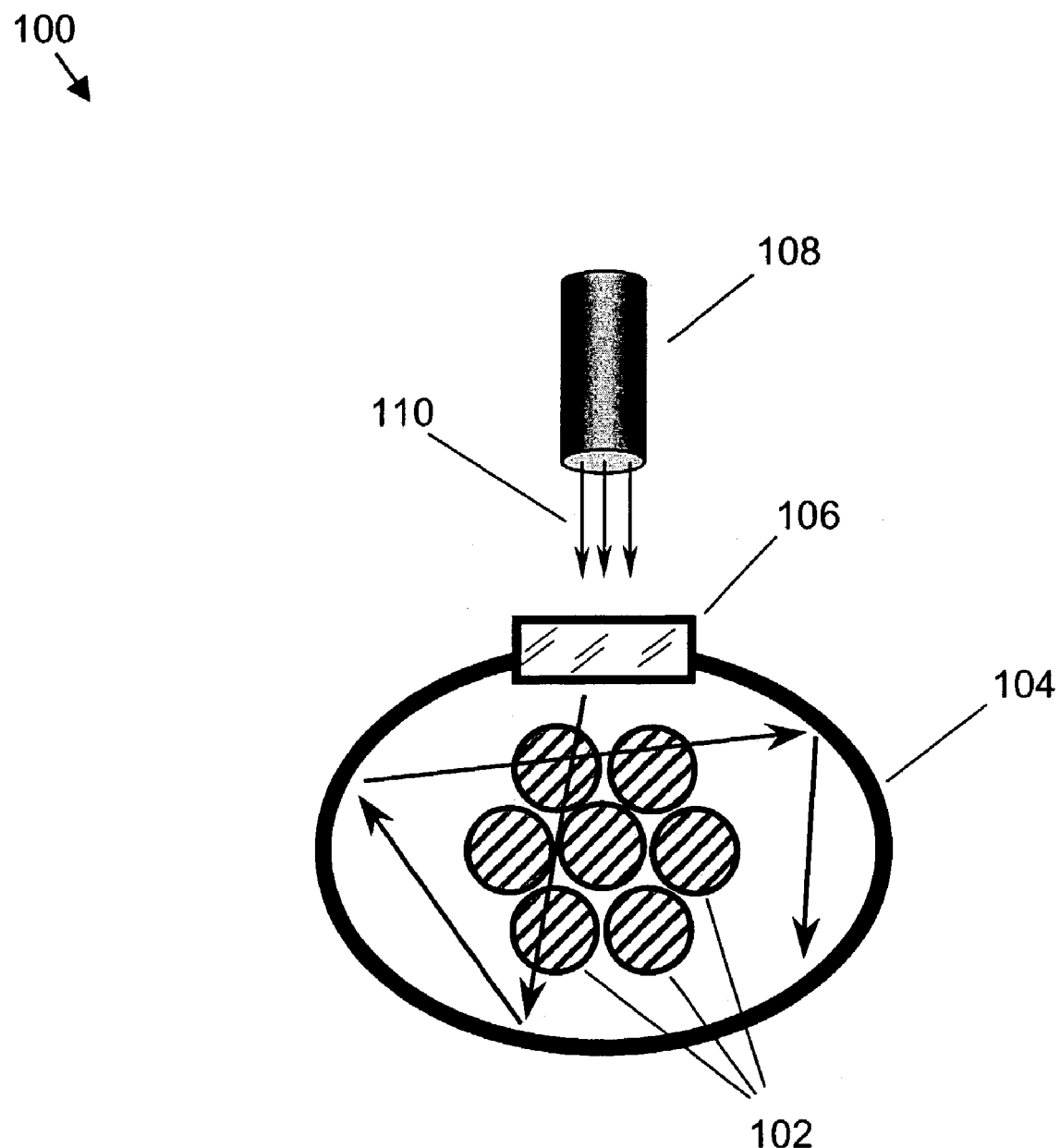
FIG. 11 shows a schematic isometric view of a cross-section end cut of another embodiment of an optical position sensor, according to the present invention.

FIG. 11 shows a schematic isometric view of a cross-section end view of another embodiment of an optical position sensor 100, according to the present invention. Sensor 100 comprises a bundle 102 of fluorescent optical fibers, contained in a tubular housing 104 that has a window 106 covering an opening into housing 104. The interior surface of housing 104 may be mirrored to make it more reflective. The shape of housing 104 may be cylindrical or oval shaped. Excitation source 108 side-pumps excitation light 110 through window 106 into fiber bundle 102. Some of excitation light 110 passes through fiber bundle 102, where it is internally reflected from the reflective interior surface of housing 104. This increases the total number of passes through the bundle of fluorescent fibers, which increases the overall absorption efficiency, and, hence, output signal of sensor 100. Window 106 isolates and protects bundle 102 of fluorescent fibers, e.g., from dust, mud, drilling fluids, etc.

Figure 12:
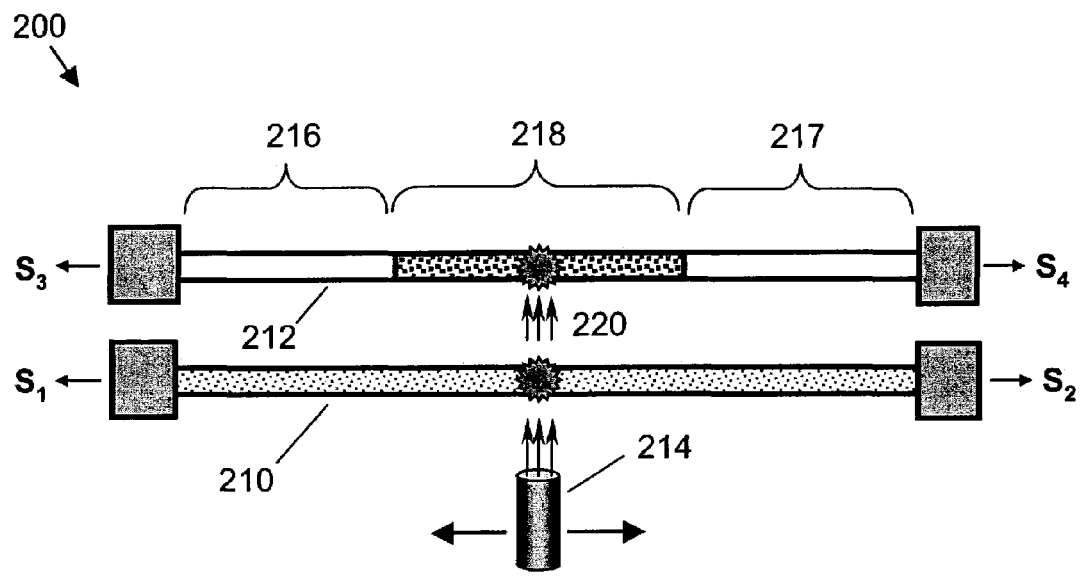
FIG. 12 shows a schematic layout of another embodiment of an optical position sensor, according to the present invention.

FIG. 12 shows a schematic layout of another embodiment of an optical position sensor 200, according to the present invention. Vernier sensor 200 comprises two (or more) spaced apart, parallel fluorescent optical fibers, base fiber 210 and vernier 212. Base fiber 210 is uniformly doped with fluorescers, and has a uniform fiber extinction coefficient, $B_{base}$, (dB/meter) along its entire length. In contrast, vernier fiber 212 is has non-uniform properties along its length. Vernier fiber 212 has two sections 216 and 217 that are not doped with fluorescers (i.e., un-doped), and a vernier section 218 that is doped with fluorescers. Vernier section 218 has a larger fiber extinction coefficient, $B_{vernier}$, (dB/meter) along the length of vernier section 218 (i.e., $B_{vernier} > B_{base}$). Excitation source 214 side-pumps base fiber 210. Some of the excitation light from source 214 passes through (and/or around) base fiber 210 and side-pumps adjacent vernier fiber 218. Although the range of vernier fiber 212 is less than the range of fiber 210 (since $B_{vernier} > B_{base}$), the resolution of vernier fiber 212 is greater than the resolution of base fiber 210 when source 214 is located within the range of vernier section 218.

Figure 13:
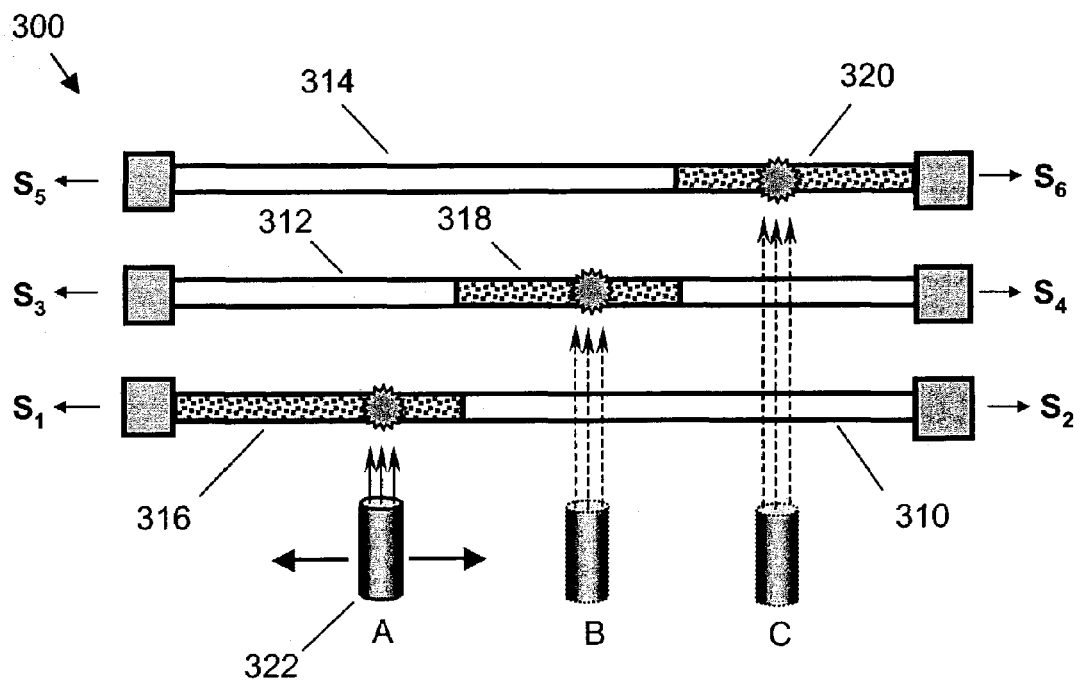
FIG. 13 shows a schematic layout of another embodiment of an optical position sensor, according to the present invention.

FIG. 13 shows a schematic layout of another embodiment of an optical position sensor 300, according to the present invention. Extended-range sensor 300 comprises a plurality (e.g., three fibers) of spaced apart, parallel optical fibers 310, 312, 314. Each fiber has a portion of its length doped with fluorescers; while the remaining portions are un-doped. The fluorescent sections, 316, 318, and 320, are arranged "head-to-tail" when viewed from the side. Excitation source 322 side-pumps the set of three fibers 310, 312, 314. At position "A", source 322 side-pumps fluorescent section 316 of first fiber 310. At position "B", source 322 passes through the undoped portion of fiber 310 and side-pumps fluorescent section 318 of second fiber 312. At position "C", source 322 passes through the undoped portions of fibers 310 and 312 and side-pumps fluorescent section 320 of third fiber 314. This geometrical arrangement provides an effectively longer range than could be achieved by using a single fiber having the same optical absorption properties (i.e., extinction coefficient, B). This arrangement may be used when a single fiber having an extended range is not available or is too expensive.

With respect to FIGS. 12 and 13, another variation is to illuminate all of the fibers equally by orientating the excitation source to be perpendicular to the plane of the drawings in FIGS. 12 and 13 and pointing down.

Figure 14A:
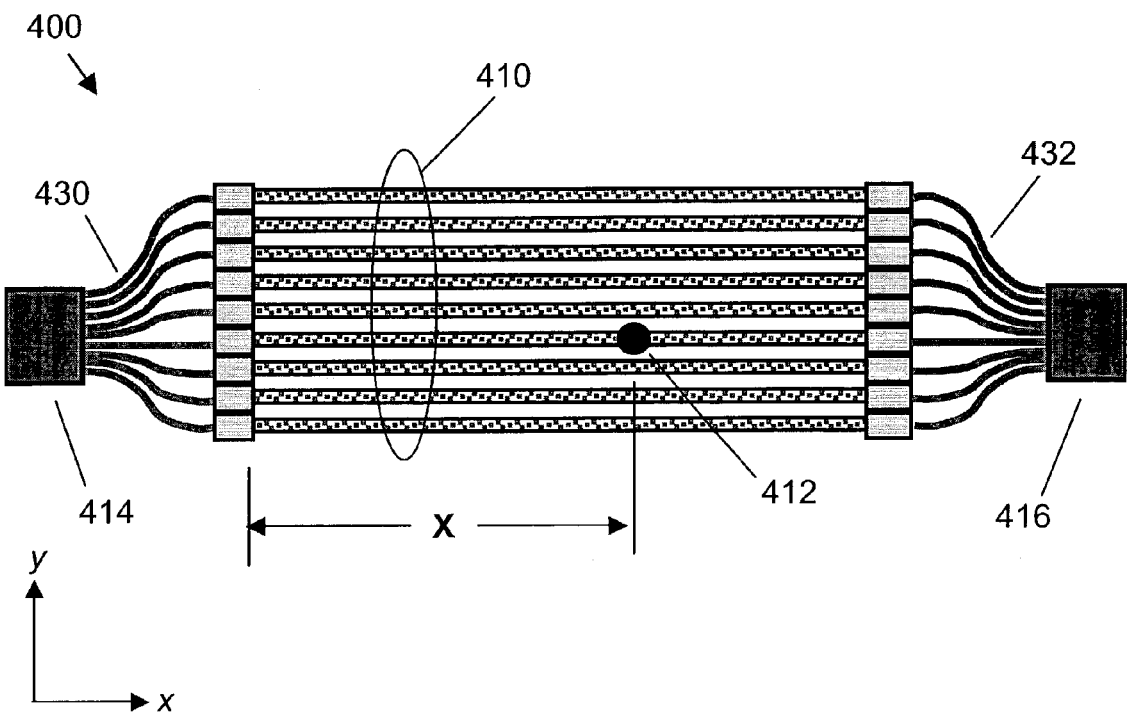
FIG. 14A shows a schematic layout of another embodiment of an optical position sensor, according to the present invention.

FIG. 14A shows a schematic layout of another embodiment of an optical position sensor 400, according to the present invention. Sensor 400 comprises a bundle 410 of parallel, closely spaced fluorescent optical fibers, each uniformly doped with fluorescers and each being uniformly absorbing. Excitation source 412 side-pumps one or more fibers in bundle 410 (note, that in this view, the direction of incident light from source 412 is oriented perpendicular to the "x-y" plane). The light exciting from all of fibers at an end of bundle 410 is carried by a set of clear optical fibers 430, 432 and collected into a common photodetector 414, 416. Sensor 400 provides the same one-dimensional measurement of horizontal position, X, except that any motion of excitation source 412 in the vertical ("y") direction does not affect the horizontal measurement (so long as the source remains within the bundle of fibers 410). If vertical motion is to be tracked in this arrangement, than each fiber would need to have it's own set of photodetectors (not shown); however, resolution in the vertical direction would be limited by the spacing between adjacent fibers.

Figure 14B:
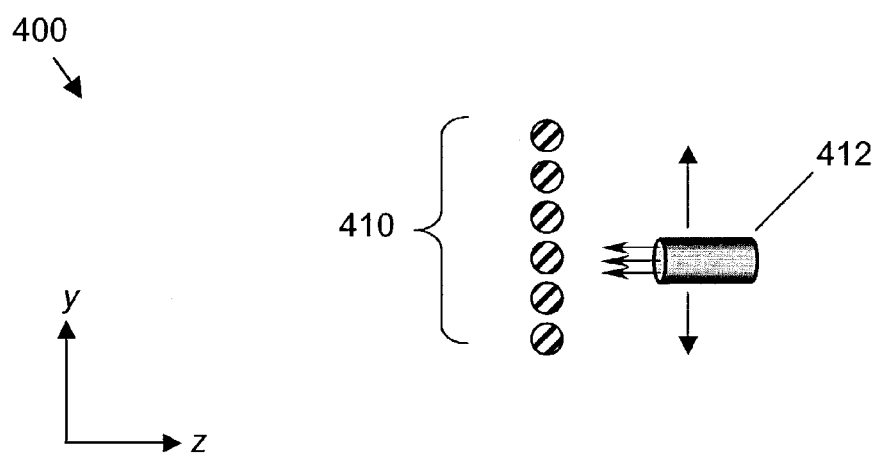
FIG. 14B shows a schematic cross-section end view of another embodiment of an optical position sensor, according to the present invention.

FIG. 14B shows a cross-section end view of sensor 400. Excitation source 412 side pumps a single fiber in bundle 410 (note, that in this view, the direction of incident light from source 412 is oriented parallel to the z-axis).

Figure 15:
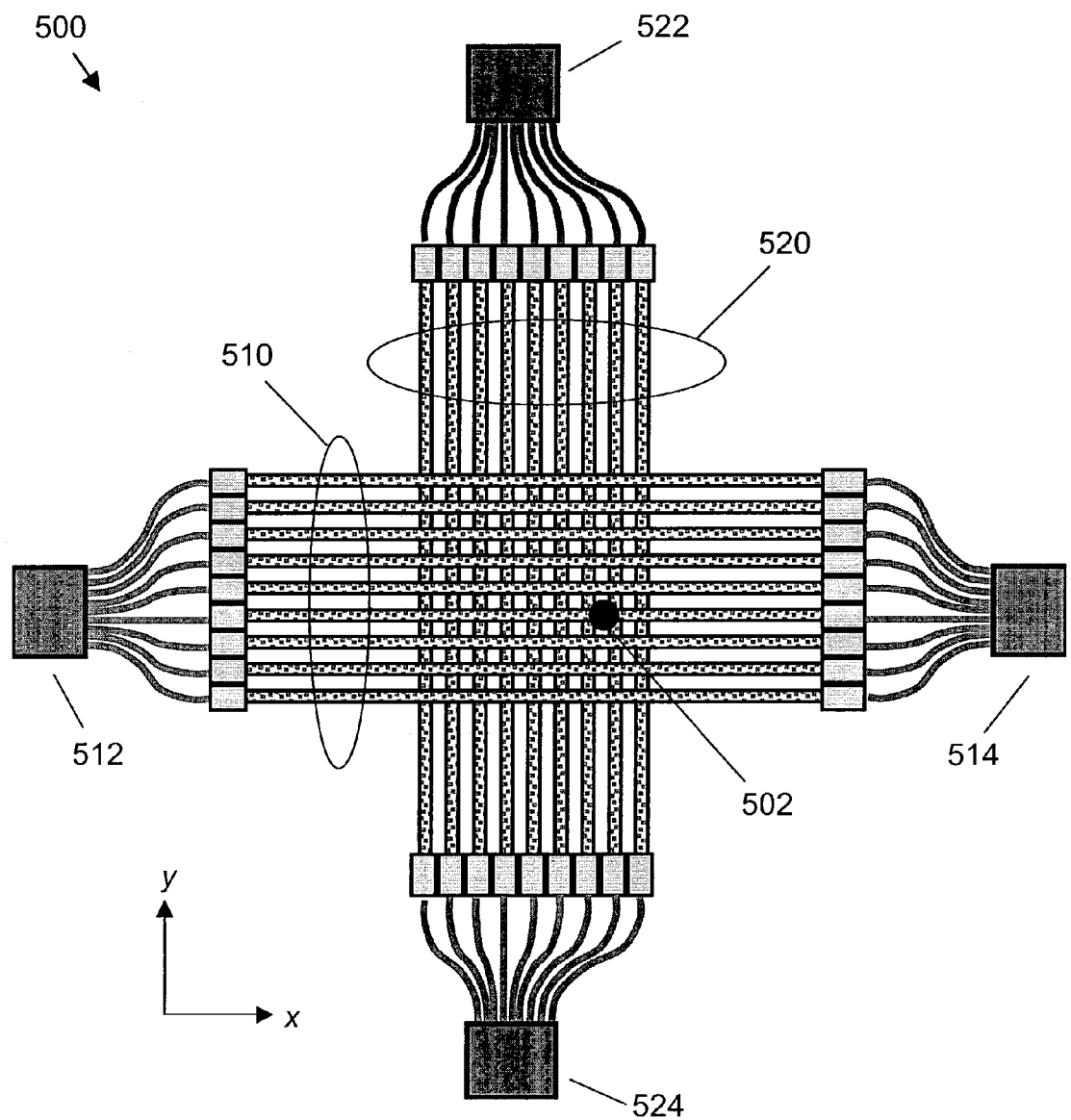
FIG. 15 shows a schematic layout of another embodiment of an optical position sensor, according to the present invention.

FIG. 15 shows a schematic layout of another embodiment of an optical position sensor 500, according to the present invention. Sensor 500 comprises a 2-D array of fluorescent optical fibers, comprising a first bundle 510 of parallel fluorescent fibers, oriented along the "X"-direction, and a second bundle 520 of parallel fluorescent fibers, oriented along the "Y"-direction. Each bundle of fibers is connected to a pair of photodetectors 512, 514 and 522, 524 at their respective ends. With this arrangement, motion of excitation source 502 can be continuously tracked in two-dimensions (X and Y).

Many other variations are possible. Since some of the excitation light may pass through the optical fibers, multiple layers of 1-D or 2-D arrays of fiber bundles may be stacked on top of one another in the Z-direction.

Figure 16A:
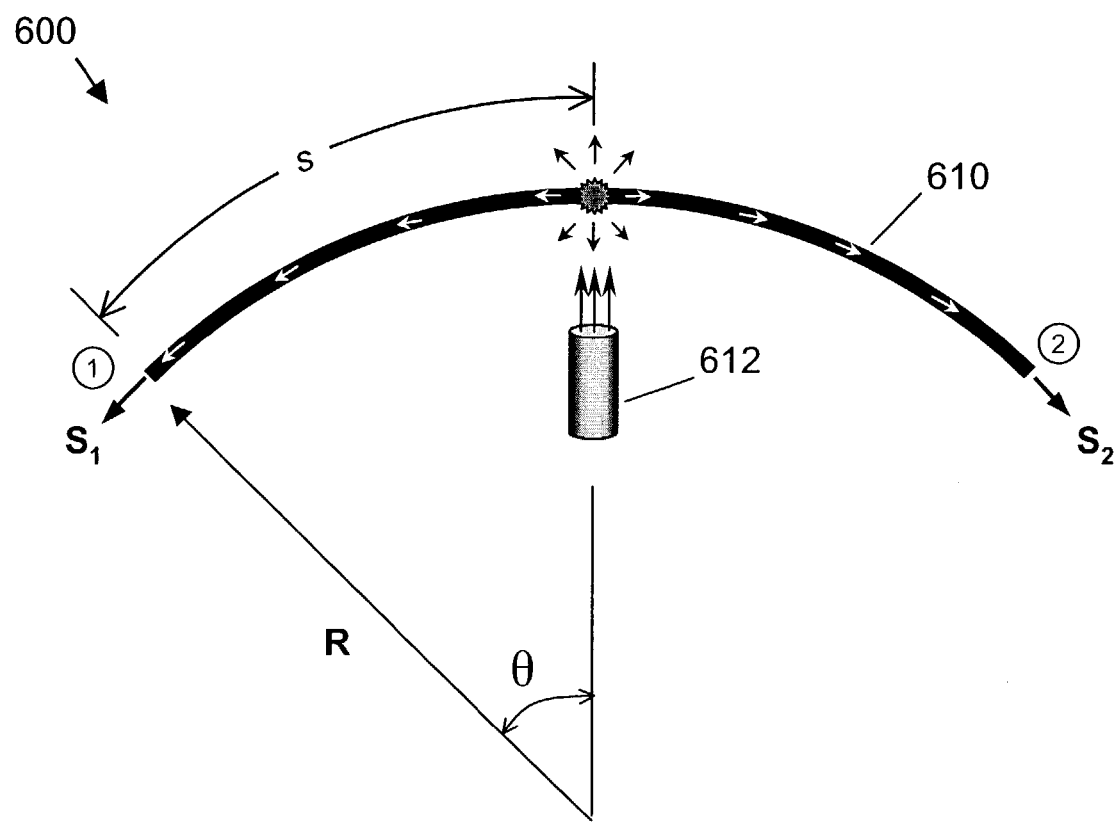
FIG. 16A shows a schematic layout of another embodiment of an optical position sensor, according to the present invention.

FIG. 16A shows a schematic layout of another embodiment of an optical position sensor 600, according to the present invention. Sensor 600 comprises fluorescent optical waveguide 610, which is curved in a circular arc with radius=R. By comparing the measured intensity of output signals, $S_1$ and $S_2$ (or the ratio of signals $S_1/S_2$), in the manner presented earlier, the angular position of excitation source 612 can be determined by simply converting the curvilinear (i.e., circumferential) path length, s, to the angular position, $\theta$.

Figure 16B:
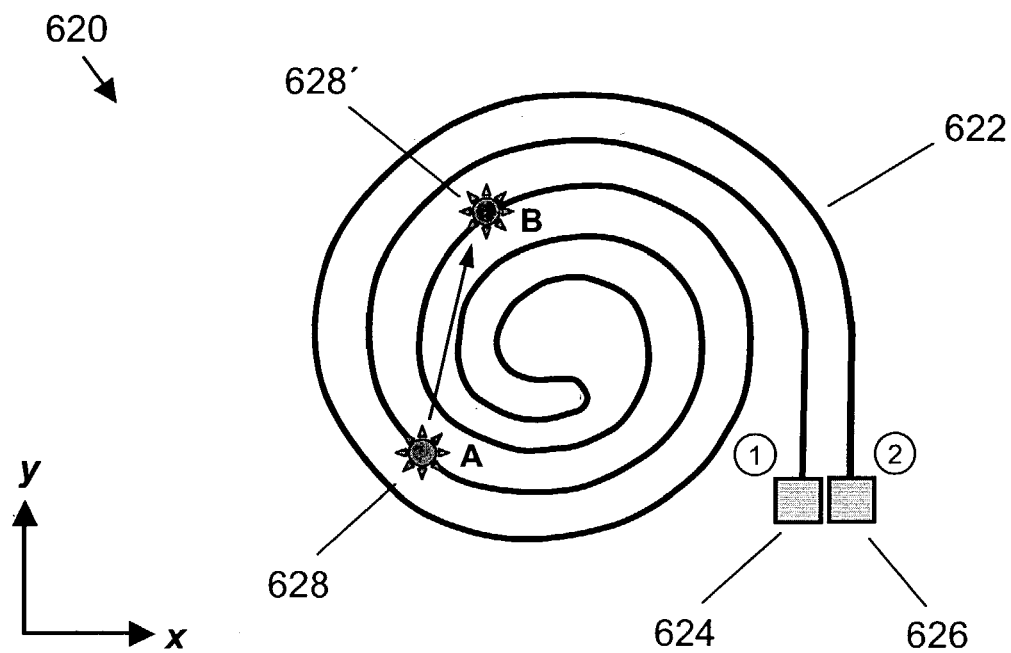
FIG. 16B shows a schematic layout of another embodiment of an optical position sensor, according to the present invention.

FIG. 16B shows a schematic layout of another embodiment of an optical position sensor 620, according to the present invention. Sensor 620 comprises a fluorescent optical fiber 622 laid out in a two-dimensional, double-spiral pattern. Movable excitation source 628 side pumps a localized region of fluorescence in fiber 622. The excited fluorescent light travels in either direction along fiber 622 towards ends "1" and "2", where photodetectors 624 and 626 measure the amount of attenuated fluorescent light emitted from ends "1" and "2", respectively. The unknown curvilinear position, s, along the axis of fluorescent optical fiber 622 (i.e., path length) can be determined by comparing the signals output from photodetectors 624 and 626, as presented earlier. This information, combined with the knowledge of the (x,y) coordinates of the out-out two-dimensional double-spiral pattern, allows a unique mapping to be made between the path length distance, s, and the (x,y) coordinate of excitation source 628. Accordingly, the two-dimensional motion of excitation source 628 as it moves from position "A" to position "B" can be uniquely determined using sensor 620.

Figure 16C:
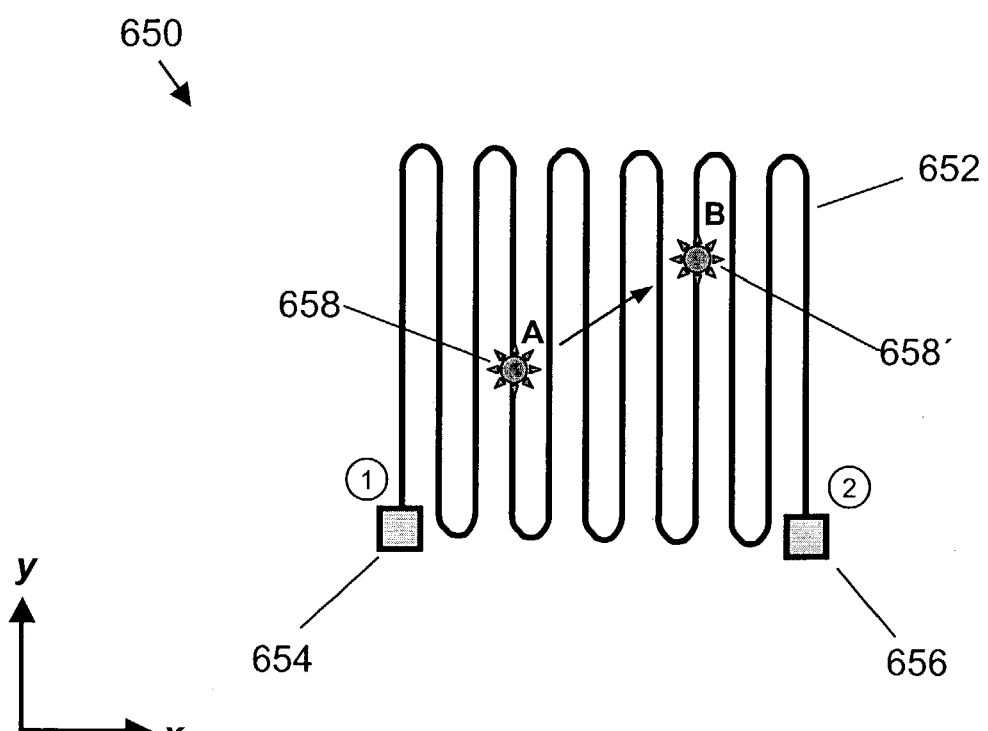
FIG. 16C shows a schematic layout of another embodiment of an optical position sensor, according to the present invention.

FIG. 16C shows a schematic layout of another embodiment of an optical position sensor 650, according to the present invention. Sensor 650 comprises a fluorescent optical fiber 652 laid out in a two-dimensional, serpentine (i.e., boustrophedon) pattern. Movable excitation source 658 side pumps a localized region of fluorescence in fiber 652. The excited fluorescent light travels in either direction along fiber 652 towards ends "1" and "2", where photodetectors 654 and 656 measure the amount of attenuated fluorescent light emitted from ends "1" and "2", respectively. The unknown curvilinear position, s, along the axis of fluorescent optical fiber 652 (i.e., path length) can be determined by comparing the signals output from photodetectors 654 and 656, as presented earlier. This information, combined with the knowledge of the (x,y) coordinates of the out-out, two-dimensional serpentine pattern, allows a unique mapping to be made between the path length distance, s, and the (x,y) coordinate of excitation source 658. Accordingly, the two-dimensional motion of excitation source 658 as it moves from position "A" to position "B" can be uniquely determined using sensor 650. It should be noted that the change in photodetector output signal as excitation source 658 moves along the X-direction is "magnified", when compared to the arrangement illustrated in FIG. 6 (which has a straight fiber 10). Hence, the path length, s, traversed when excitation source 658 moves along the X-direction from one segment to another is approximately equal to the vertical length of a single segment (i.e., in the Y-direction) rather than simply the length along the axial coordinate, X, as would be the case for a straight fiber (see, e.g., FIG. 6). In this sense, a serpentine-type sensor 650 generates a greater change in output signal (i.e., magnified output) for the same amount of change in the position of the excitation source along the X-direction, relative to a sensor using a straight (unwrapped) fiber. The magnification factor provided by this serpentine/folded shape provides increased resolution, when compared to an unmagnified, straight fiber.

Figure 17A:
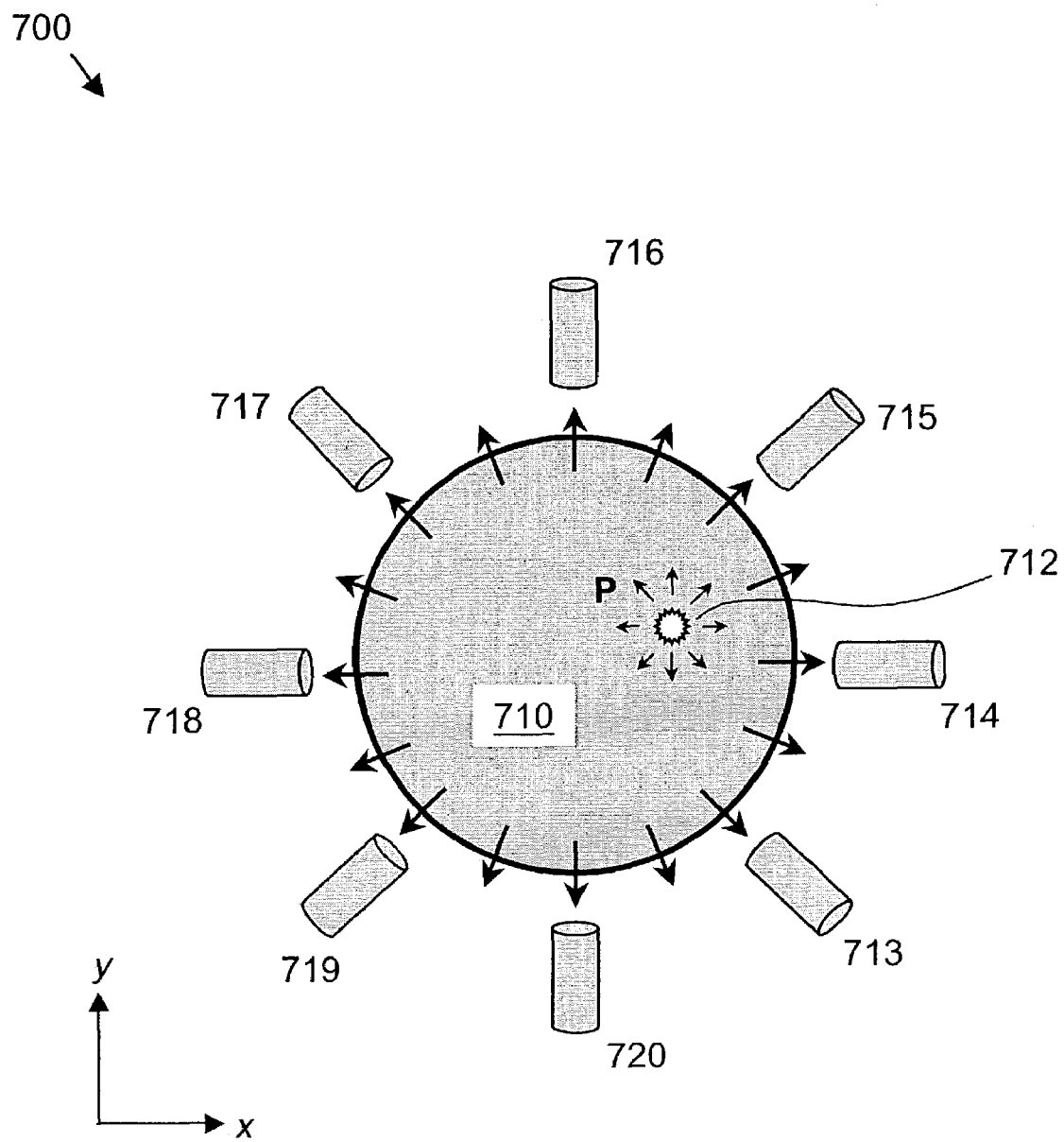
FIG. 17A shows a schematic layout of another embodiment of an optical position sensor, according to the present invention.

FIG. 17A shows a schematic plan view of another embodiment of an optical position sensor 700, according to the present invention. Sensor 700 comprises a fluorescent disk 710 made of a fluorescent material. For example, St. Gobain, Inc. manufactures a material, methyl styrene, which can be doped with fluorescers and cast into a disk. The central axis of disk 710 is parallel to the Z-direction (see FIG. 17B). Excitation source 712 (which shines a beam of excitation light perpendicular to the X-Y plane of disk 710, i.e., "side-pumps") excites isotropic fluorescence in a localized region at point "P", having planar position coordinates (x,y). A plurality of photodetectors 713–721 (in this example, eight detectors) are uniformly spaced around disk 710 and are oriented to measure the intensity of fluorescent light emitted from the outer circumference of disk 710. The two-dimensional coordinates (x,y) of source 712 can be uniquely determined by using the set of eight intensity values measured by the eight photodetectors 713–721, in a manner similar to the one-dimensional measurement using one (or two) photodetectors that was described earlier. Such a technique is similar, also, to finding the epicenter of an earthquake using a fixed number of seismometers. The light entering each photodetector has been attenuated by a unique amount that depends on the amount of absorption of fluorescent light over the distance from source point "P" to each photodetector. Sensor 700 thereby provides a continuous measurement of 2-D position inside the boundaries of disk 710. It is believed that a minimum of three photodetectors, spaced 120 degrees apart, would be required to uniquely determine the (x,y) position of source 712 inside of disk 710. However, using more than three detectors may improve the resolution and accuracy of the position measurement. Also, the position of multiple excitation sources may be independently determined, provided that each source is modulated at a different frequency, as was presented earlier.

Figure 17B:
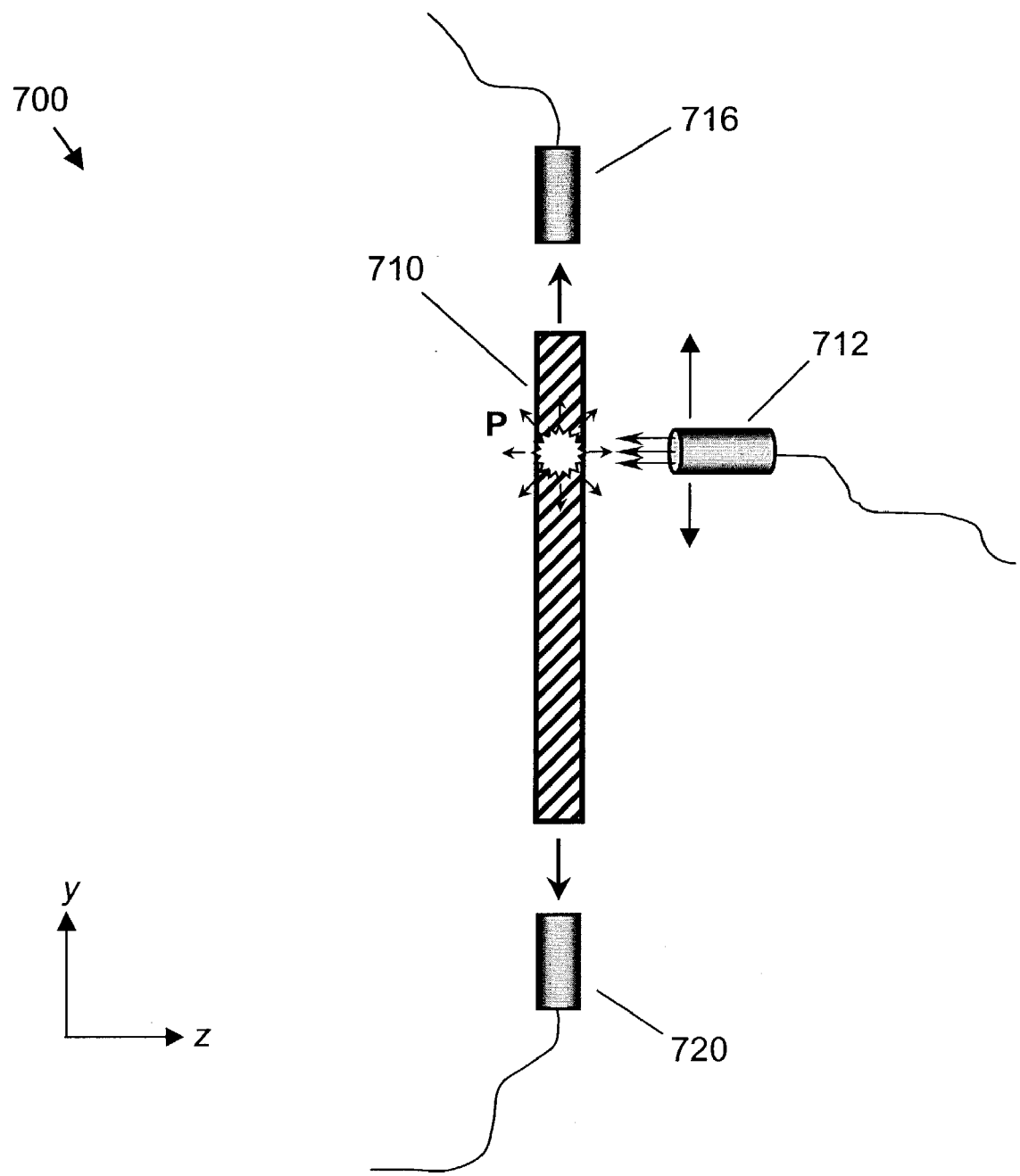
FIG. 17B shows a schematic layout of another embodiment of an optical position sensor, according to the present invention.

FIG. 17B shows a schematic end view of another embodiment of an optical position sensor 700, according to the present invention. The central axis of disk 710 is oriented along the Z-direction (see FIG. 17B). Excitation source 712 shines a beam of light perpendicular to the X-Y plane of disk 710, (i.e., "side-pumps") and excites fluorescence in a localized region labeled as point "P".

It is believed that the three-dimensional position (x,y,z) of one or more point excitation sources of fluorescence located inside of a solid, three-dimensional, optically transmissive, fluorescent body with uniform optical absorption properties, may be determined by surrounding the solid body with an array of multiple photodetectors, in a manner similar to that presented with respect to the two-dimension sensor illustrated in FIGS. 17A and 17B. One could imagine that a minimum of four photodetectors would be required to uniquely determine the 3-D position of a point excitation source.

Figure 18A:
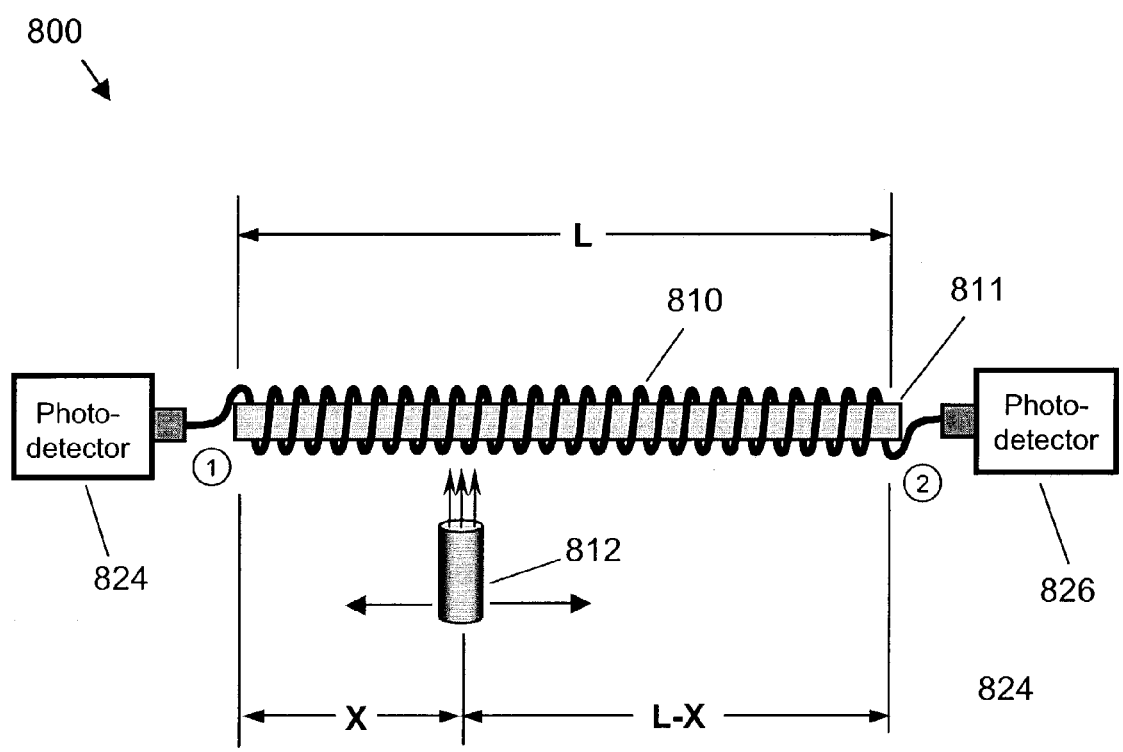
FIG. 18A shows a schematic layout of another embodiment of an optical position sensor, according to the present invention.

FIG. 18A shows a schematic layout of another embodiment of an optical position sensor 800, according to the present invention. Sensor 800 comprises a fluorescent optical fiber 810 wrapped in a helical (spiral) pattern about a cylindrical core 811. Movable excitation source 812 side pumps a localized region of fluorescence in fiber 810. The excited fluorescent light travels in either direction along fiber 810 towards ends "1" and "2", where photodetectors 824 and 826 measure the amount of attenuated fluorescent light emitted from ends "1" and "2", respectively. The unknown axial position, X, along the longitudinal axis of cylindrical core 811 can be determined by comparing the signals output from photodetectors 824 and 826, as presented earlier. Cylindrical core 811 may be opaque or transparent, solid, hollow, or tubular, depending on the application. It should be noted that the change in photodetector output signal as excitation source 812 moves along the X-direction, is "magnified" or "enhanced, when compared to the arrangement illustrated in FIG. 6 (which has a straight fiber 10). This is due to the fact that optical fiber 810 has been coiled into a compact, helical shape. Hence, the path length, s, traversed when excitation source 812 moves axially from one coil to another is given by the circumference of the coil ($2\pi R$), rather than the axial distance, X, as would be the case for a straight fiber (see, e.g., FIG. 6). In this sense, a spiral-wrapped sensor generates a greater change in output signal (i.e., magnified output) for the same amount of change in the axial position of the excitation source, relative to a sensor using a straight (unwrapped) fiber. Thus, a spiral-wrapped/coil fiber design provides for enhanced position resolution, as compared to a straight fiber design. Note also that the best accuracy and reproducibility for position sensor 800 can be attained by providing good alignment of excitation source 812 with respect to the axial centerline of the helical/spiral pattern and cylindrical core 811, so that any motion perpendicular to the axis of travel (i.e., the primary direction), is minimized. Good concentric axial alignment may be achieved by providing an outer cylindrical tube/housing that closely fits around the outer surface of helically-shaped fiber 810 (e.g., a piston/cylinder geometry).

Figure 18B:
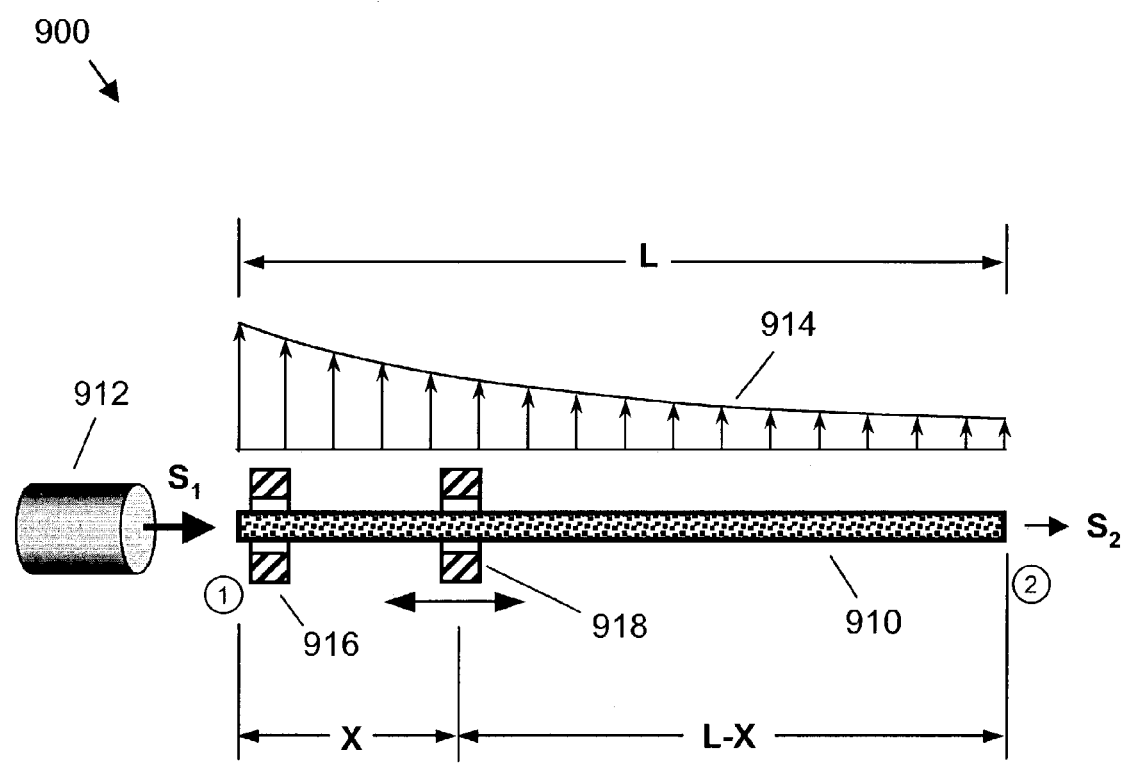
FIG. 18B shows a schematic layout of another embodiment of an optical position sensor, according to the present invention.

FIG. 18B shows a schematic layout of another embodiment of an optical position sensor 900, according to the present invention. It is possible to reverse the operation of the fluorescent optical position sensors presented in FIGS. 1–17 by reversing the positions of the excitation source and photodetectors. In this alternative "inverse" embodiment, excitation light $S_1$ from excitation source 912 is incident on, and pumped into, either one or both ends of fluorescent waveguide 910. As the fluorescent light travels down waveguide 910, it is absorbed by the doped fluorescers, which emit fluorescent light. The intensity of excitation light, and, hence, fluorescence intensity, decays exponentially as a function of distance down the waveguide away from excitation source 912, as illustrated schematically by intensity curve 914. One or more photodetectors 916, 918 measure the intensity of fluorescence emitted at specific, localized positions along waveguide 910. Specialized "ring" photodetectors may be used, which circumferentially surrounds the fiber 360 degrees with an optical geometry that collects all of the light emitted around the circumference of the fiber, for a small distance along the length. A reference "ring" photodetector 916 can be fixed at a stationary position on waveguide 910, e.g., closest to the beginning of the waveguide where the pump source 912 is attached (and where the intensity of fluorescence is greatest). A second, movable "ring" photodetector 918 is located at the unknown, variable position, X, where it measures the attenuated intensity of fluorescent light emitted by waveguide 910. Equations similar to equations (1)–(6) can be derived that express the unique relationship between measured light intensity and position along the fiber, in this "reversed" or "inverse" mode of operation.

A specialized "ring" photodetector may comprise a loop of a second type of optical fiber that is doped with a second fluorescent material that is excited by the fluorescent light emitted by the primary fiber. For example, blue light can be used to pump the primary fiber, which fluoresces in green light. The green fluorescent light emitted from the primary fiber would, in turn, excite fluorescence in the secondary (loop) fiber at an even longer wavelength, e.g., orange or red.

Method of Operation

An embodiment of a method of operating a fluorescent optical position sensor may comprise the following steps: providing a fluorescent optical waveguide; generating a non-uniform distribution of fluorescent light inside of the waveguide; and measuring fluorescent light emitted from the waveguide with one or more photodetectors.

Another embodiment of a method of determining the position in one dimension of a source of fluorescence inside of a fluorescent optical waveguide may comprise:

a) providing a fluorescent optical waveguide having a first end, an opposing second end, and a one-dimensional curvilinear coordinate system having an origin at the said first end, and extending in a direction pointing towards the second end;

b) exciting a source of fluorescence in the localized region of the waveguide at an unknown position, x, as measured in the curvilinear coordinate system;

c) measuring a first intensity of light, $S_1$, emitted from the first end of the waveguide;

d) measuring a second intensity of light, $S_2$, emitted from the second end of the waveguide; and e) determining the position, x, of the excitation light source, by comparing the measured first and second intensities, $S_1$ and $S_2$, of the light emitted from the ends of the waveguide.

Experimental Test Results

Figure 19:
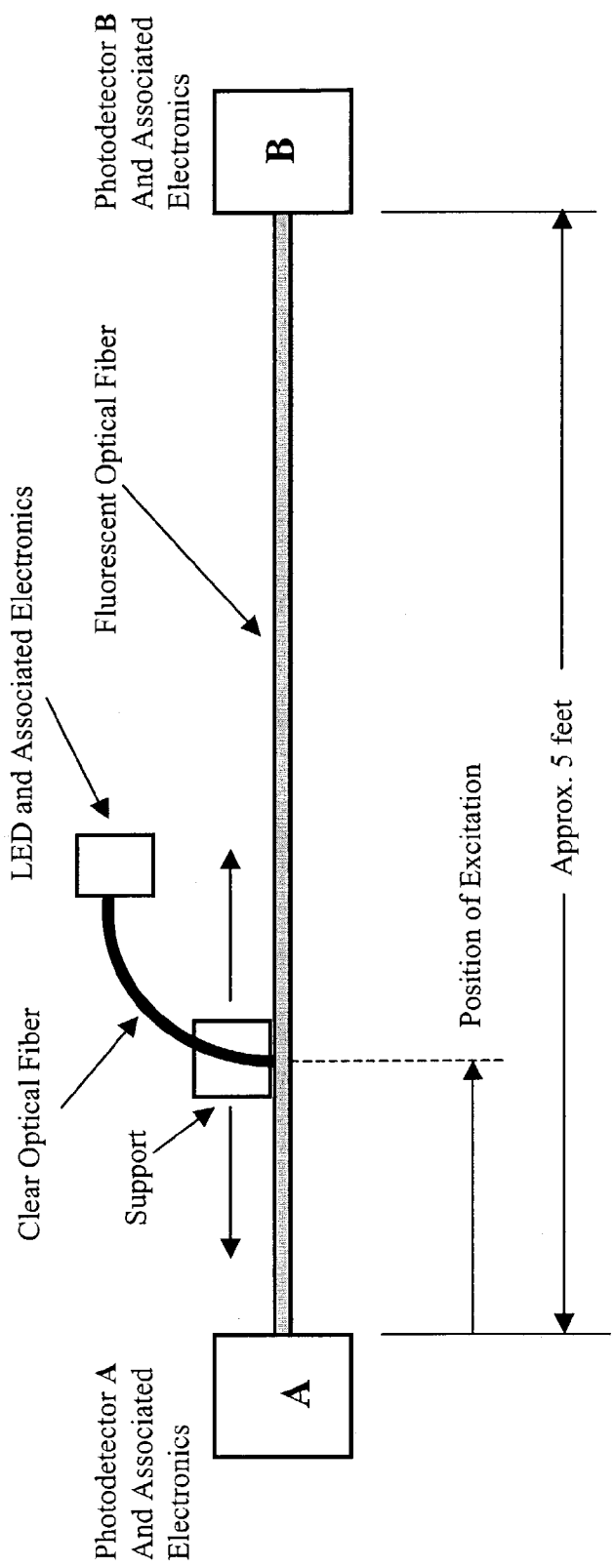
FIG. 19 shows a schematic layout of the experimental setup, according to the present invention.

FIG. 19 shows a schematic layout, uncluttered by detail, of the experimental setup, according to the present invention. A number of experiments were performed that successfully demonstrated the operation of an embodiment of the present invention. Three different fluorescent fibers were tested, all samples of plastic fibers from Saint Gobain, Inc. They produced an amber, green, or red color and were used because they were readily available and were absorbing enough to demonstrate the desired effect over a convenient length, about five feet. Glass fibers, on the other hand, could be used over hundreds of feet.

For the first ("DC") test, the fiber was covered with an opaque sheath having small openings along its length where the excitation source could be positioned. Only one opening was uncovered at a time, so that all ambient light could be excluded. In addition, aluminum foil was placed beneath the fiber, so that the excitation reflected off it made a second pass through the fiber. The excitation source consisted of a bundle of four clear optical fibers coupled at their opposite end to a blue or green LED. For the DC test, a steady electrical current was sent through the LED, and the detector circuit at either end consisted simply of a back-biased P-I-N diode in series with a 100 K-Ohm resistor. The voltage across the resistor was proportional to the optical power falling in the photodiode.

For the second ("AC") test, the opaque sheath was removed, exposing the fiber to ambient lighting produced by the sun and overhead fluorescent tubes. An electrical current, modulated at 12 kHz, was sent through the LED, and the output of the detector circuit was sent through a bandpass electrical filter peaked at the same frequency and having a negligible response at 120 Hz. This is the fundamental frequency of the signal produced by the fluorescent tubes. The filter allowed no DC signals to pass through.

Figure 20:
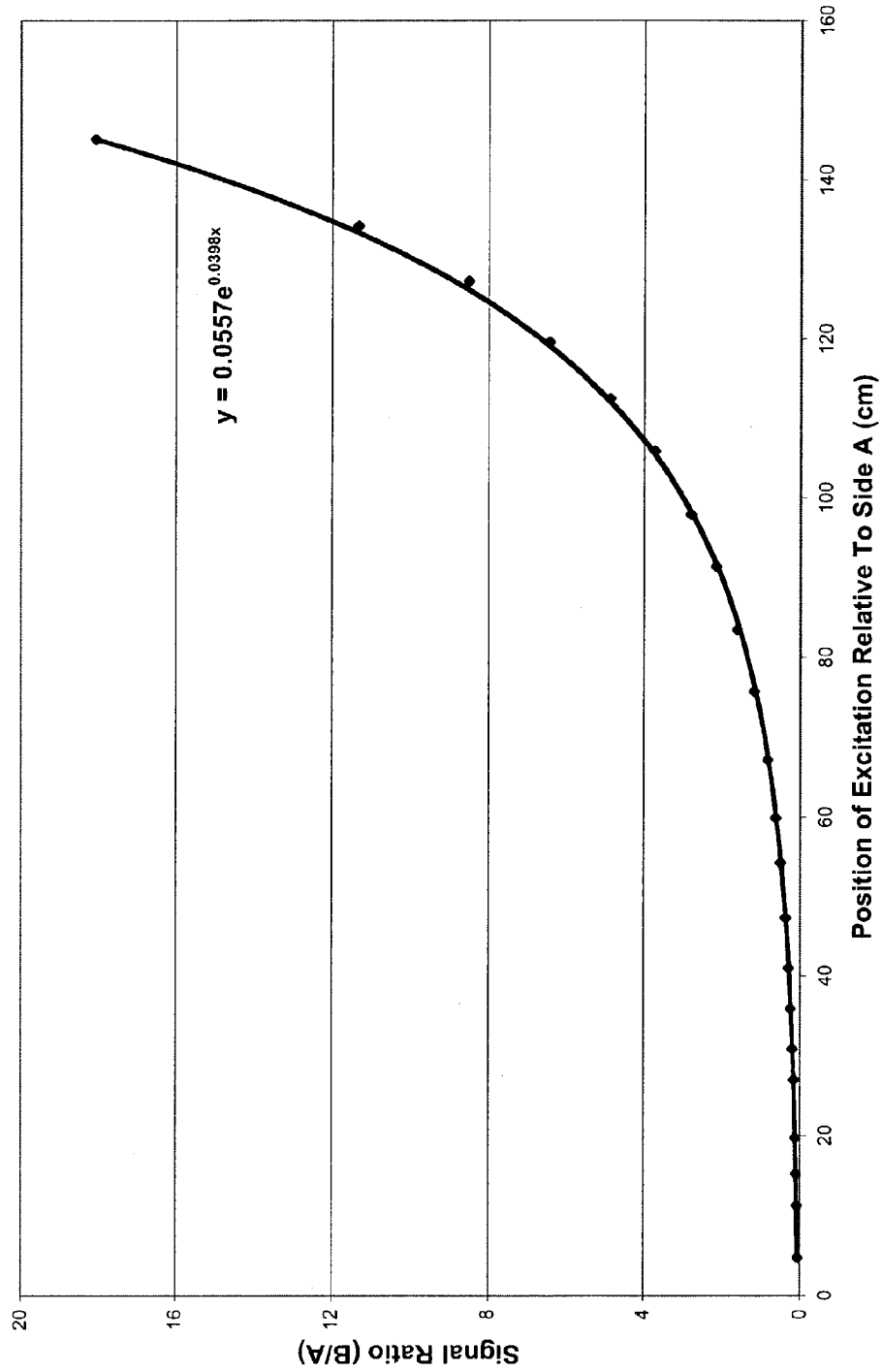
FIG. 20 shows experimental results from an optical position sensor, according to the present invention.

FIG. 20 is a plot of the DC measurements on the amber fiber excited by the blue LED, along with a least-squares fit to an exponential curve. We notice the excellent fit of the curve to the data, as supported by equation (3). An exponential behavior is possible if the absorption is constant over the fluorescence spectrum.

Figure 21:
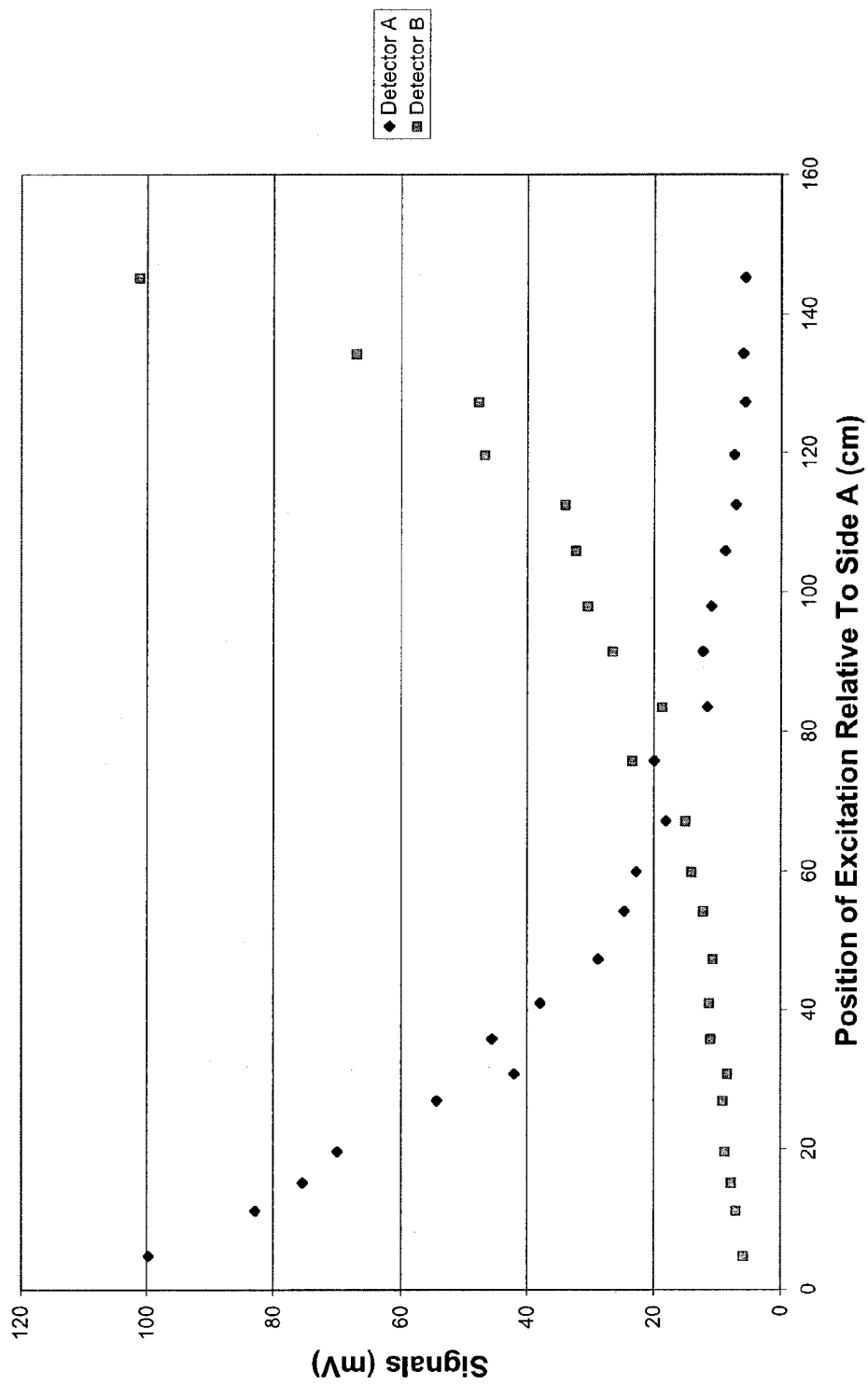
FIG. 21 shows experimental results from an optical position sensor, according to the present invention.

FIG. 21 is a plot of the individual signals, which demonstrate the expected general trend, but which also contain noticeable scatter. The simple apparatus was not refined enough to produce the same level of excitation at every point of application. As expected, this scatter is absent in the ratio.

Figure 22:
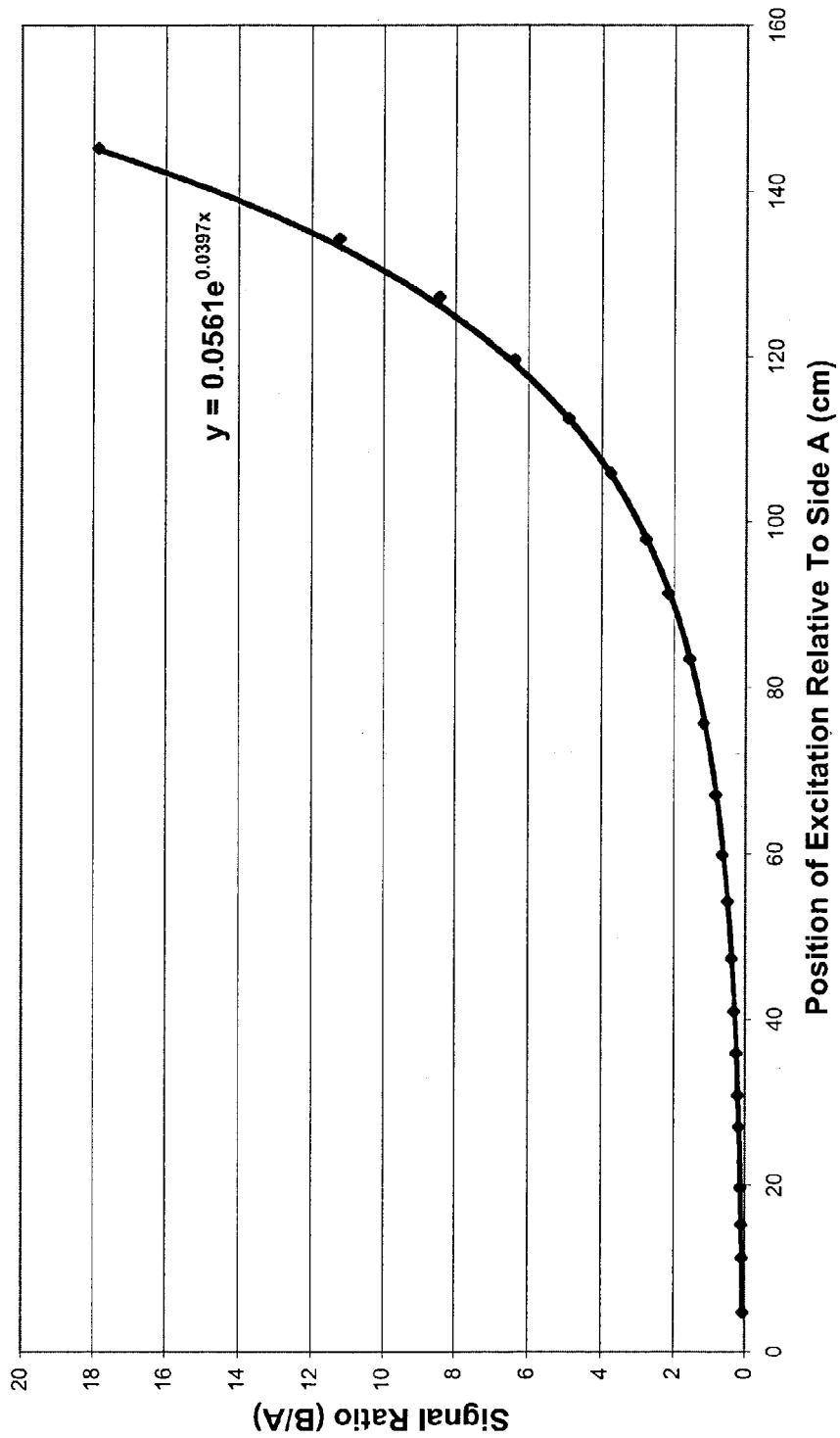
FIG. 22 shows experimental results from an optical position sensor, according to the present invention.

FIG. 22 is the analog of FIG. 20 for excitation by the green LED. There is essentially no difference between the two sets of data. However, the green LED produced much lower individual fluorescence signals than did the blue LED, presumably because the excitation spectrum for this fiber is higher there. The green LED was not used for any other measurement.

Figure 23:
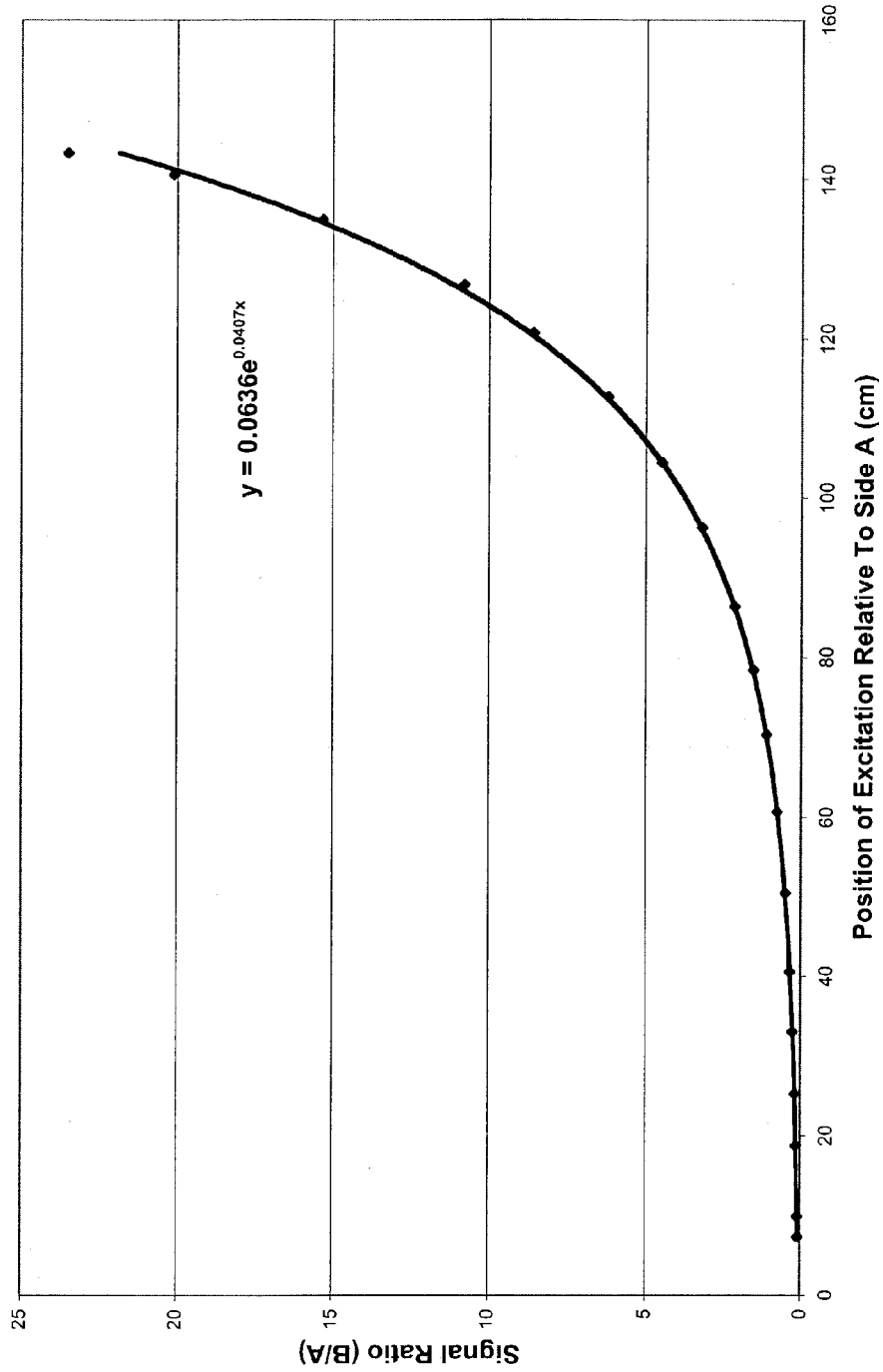
FIG. 23 shows experimental results from an optical position sensor, according to the present invention.
Figure 24:
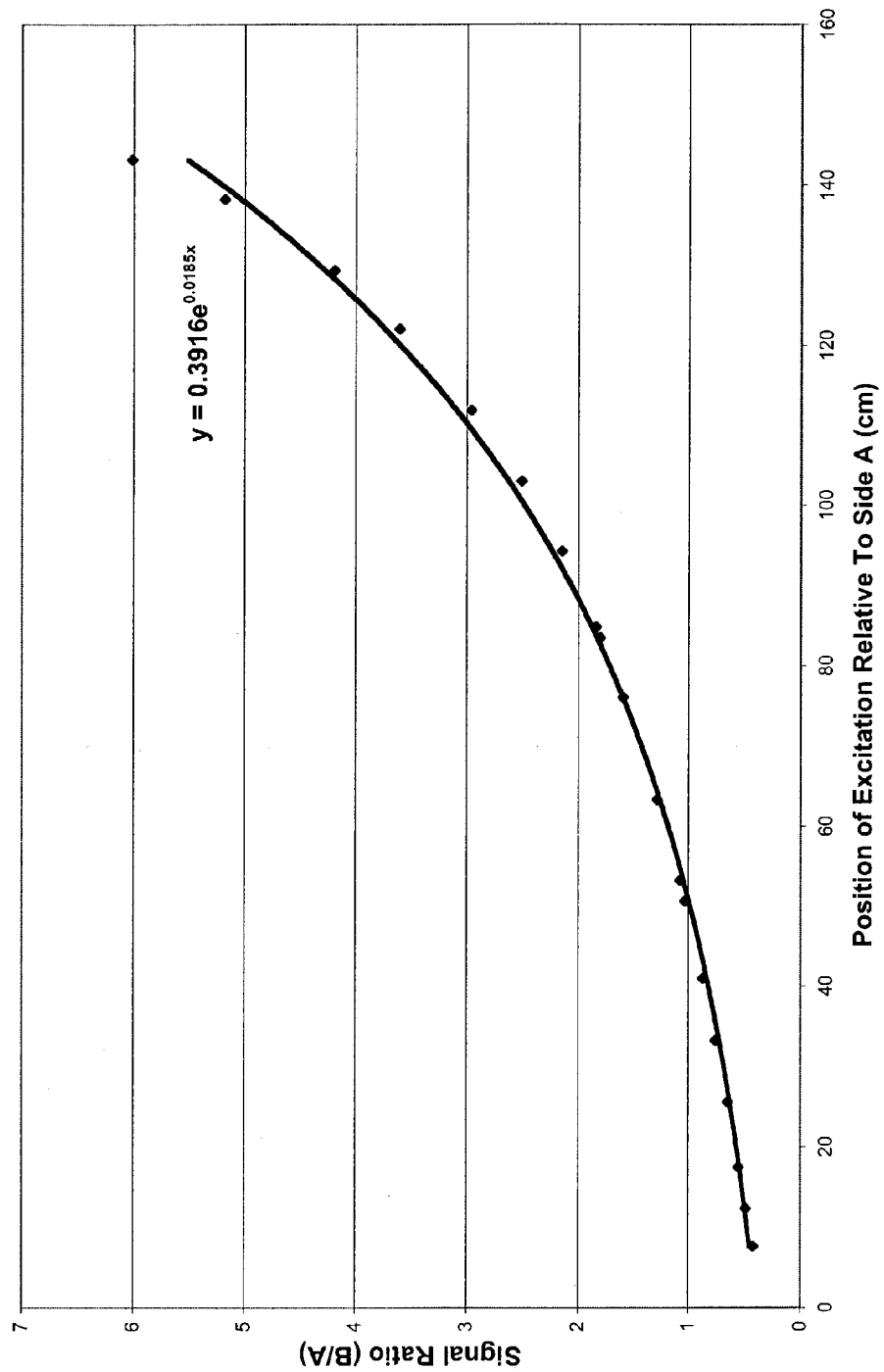
FIG. 24 shows experimental results from an optical position sensor, according to the present invention.

FIG. 23 is a plot of the AC measurements on the amber fiber, which, as expected, are very similar to the DC results. Consequently, only AC measurements were performed on the other two fluorescent fibers. Those on the red one are shown in FIG. 24, which also fit very well to an exponential.

Figure 25:
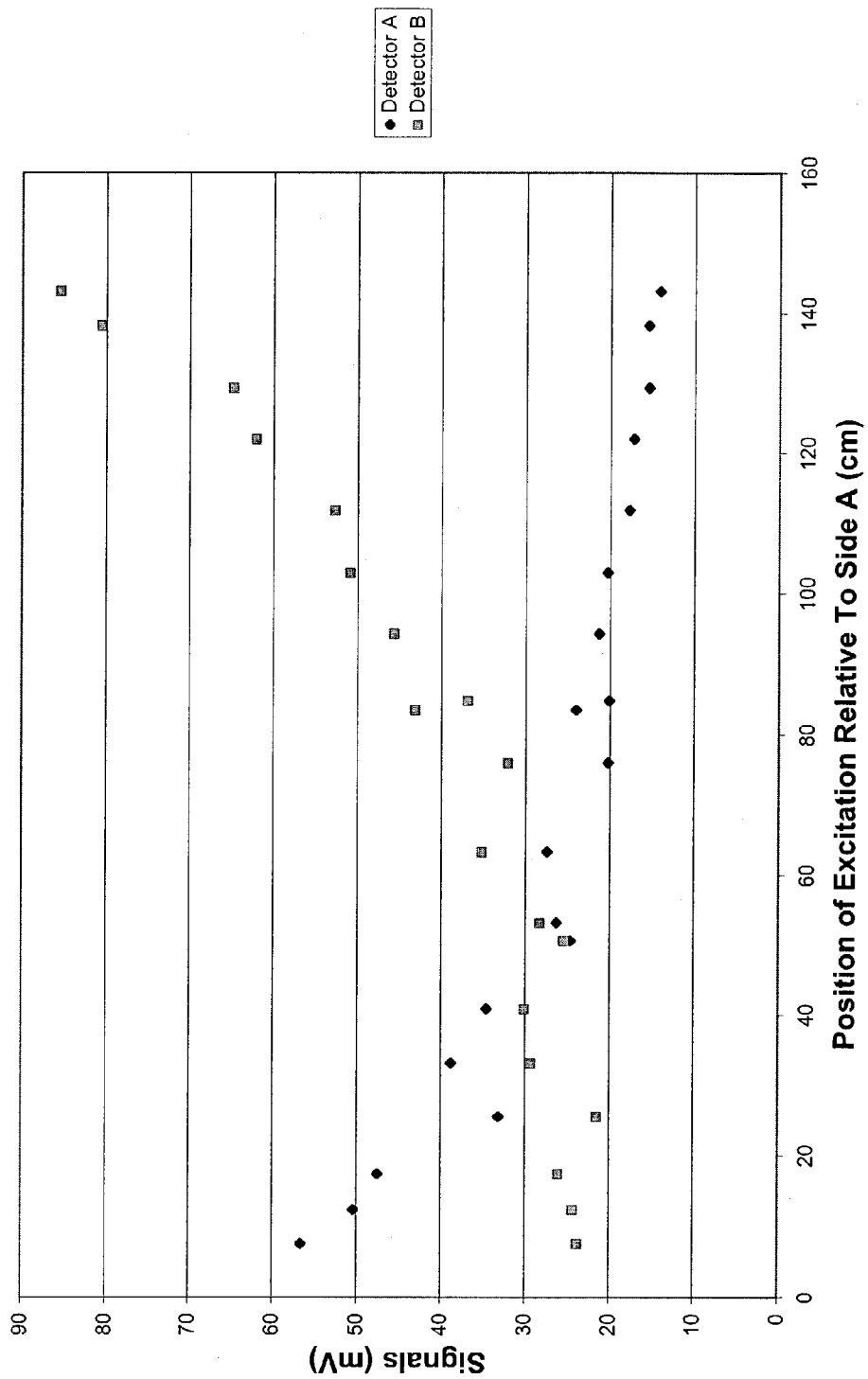
FIG. 25 shows experimental results from an optical position sensor, according to the present invention.

Analogous to FIG. 21, FIG. 25 illustrates the scatter in the individual measurements not present in the ratio.

Figure 26:
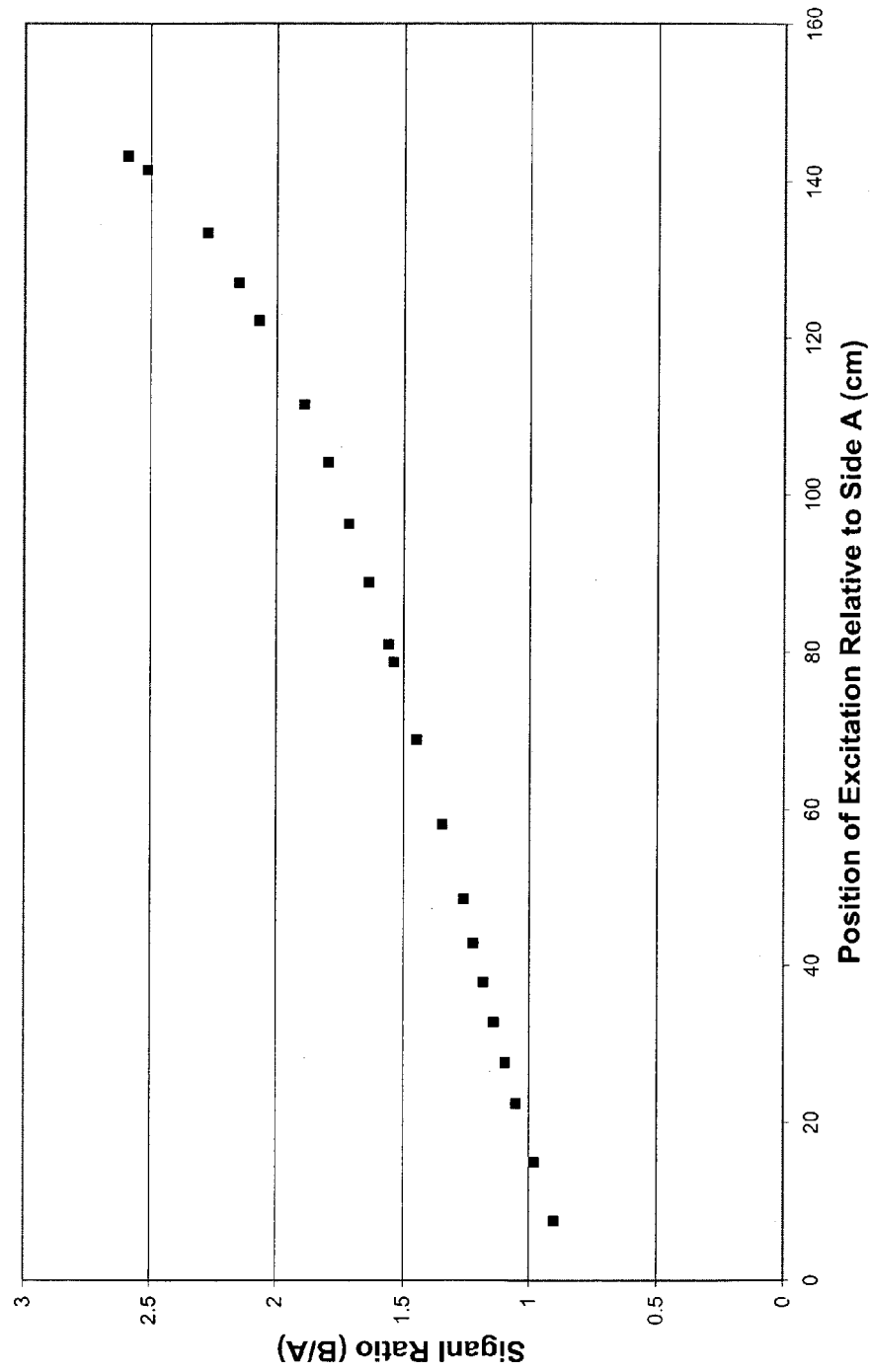
FIG. 26 shows experimental results from an optical position sensor, according to the present invention.
Figure 27:
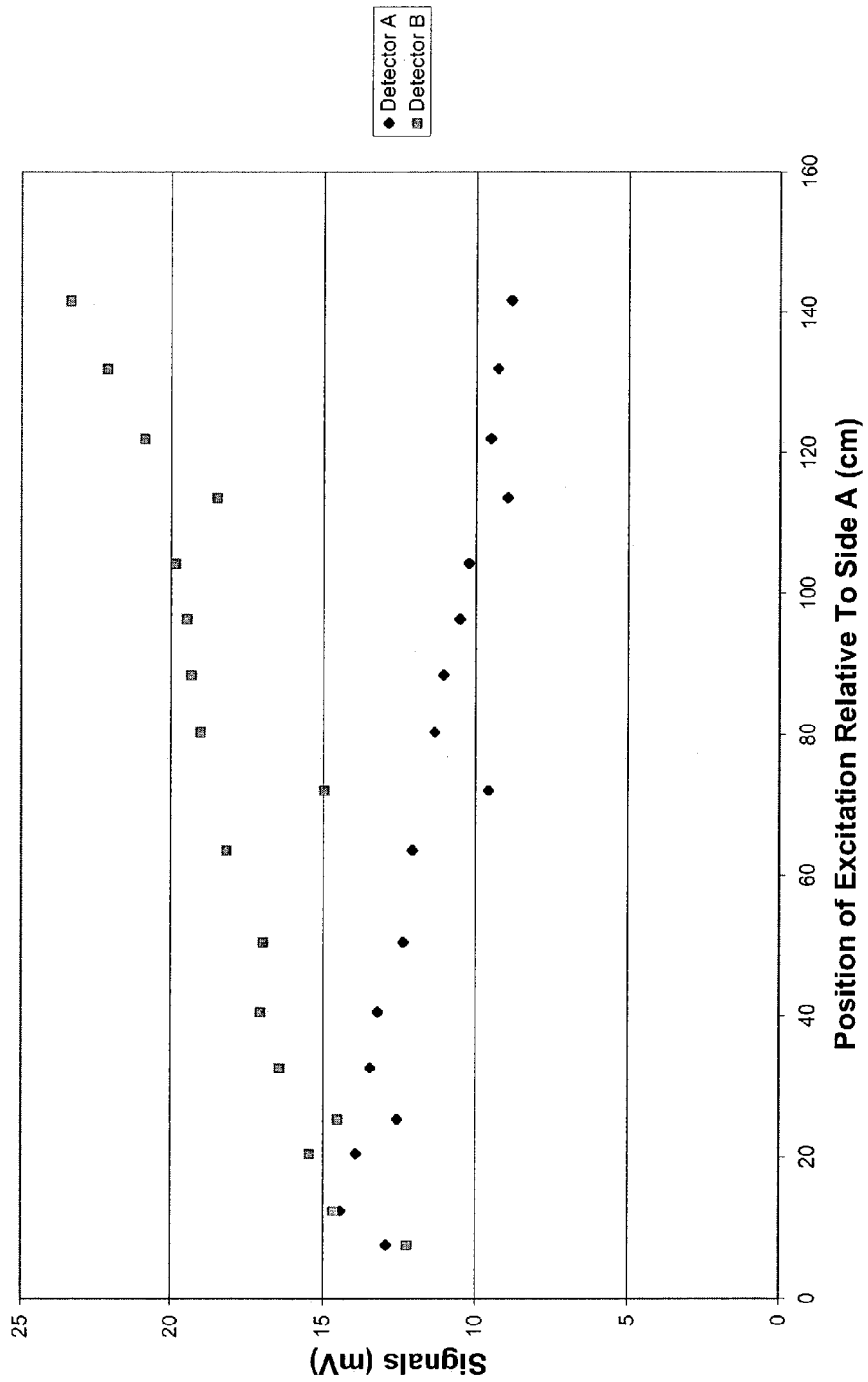
FIG. 27 shows experimental results from an optical position sensor, according to the present invention.

FIGS. 26 and 27 are plots of the ratio and the individual measurements on the green fiber, respectively. The comments made earlier concerning scatter also apply to this fiber, but the ratio is definitely not an exponential, in this case. The non-exponential behavior is possibly the result of differential absorption within the emission spectrum of this fiber.

Figure 28:
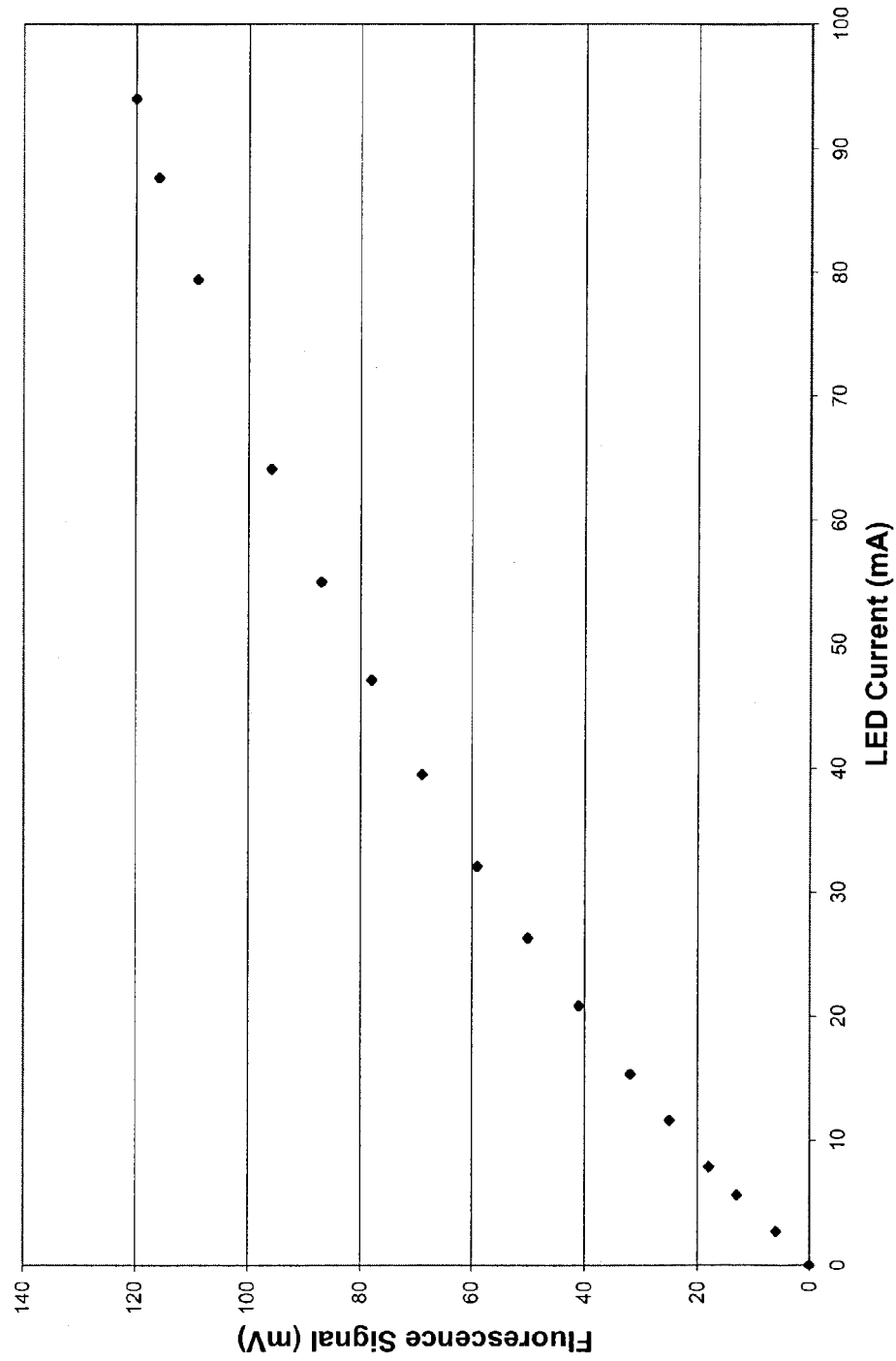
FIG. 28 shows experimental results from an optical position sensor, according to the present invention.

As an aside, one may wonder whether the fluorescence generated within the fiber is linear in the excitation power, or whether it saturates over the range of range power used in this experiment. Saturation will not affect the signal ratio, but it will reduce the individual signals below what they would have been in its absence. Saturation was examined early on by using the DC technique on the amber fiber. With the point of excitation fixed, the current to the blue LED was varied from zero to the value normally used. The signal at one end was recorded as a function of this current. The relationship is shown in FIG. 28. The clear optical fibers were then coupled directly to the photodetector and the current was varied over the same range.

Figure 29:
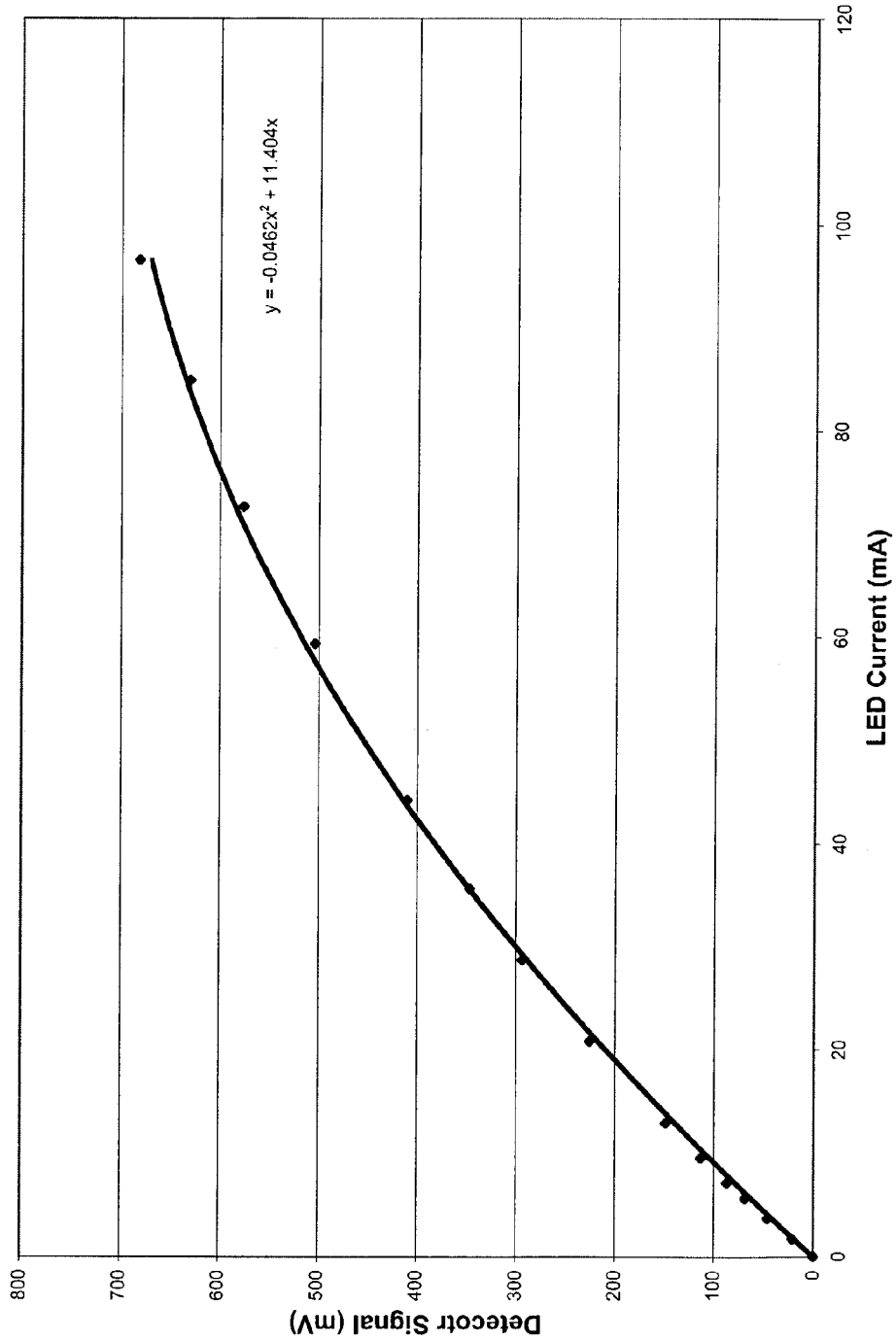
FIG. 29 shows experimental results from an optical position sensor, according to the present invention.
Figure 30:
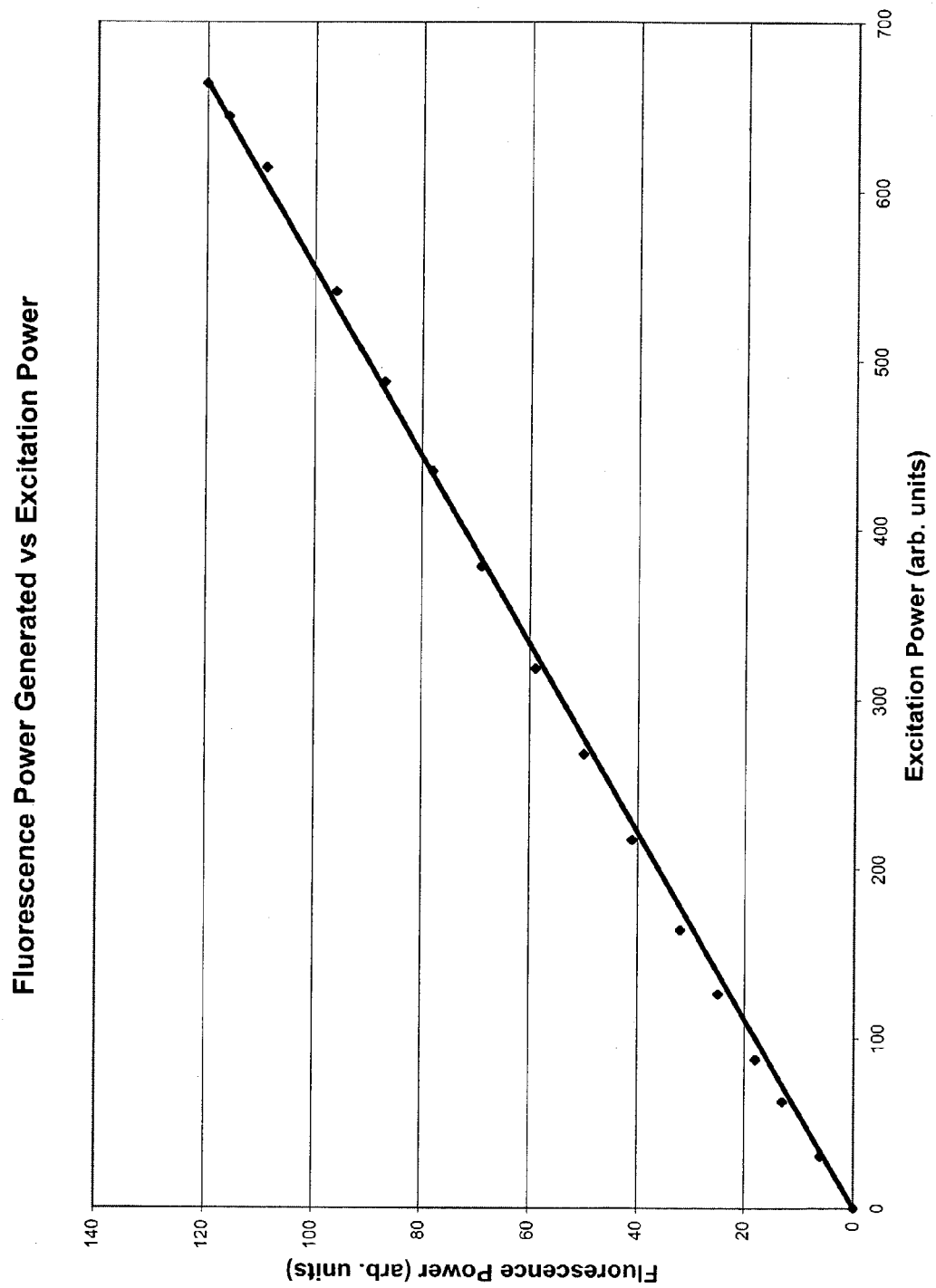
FIG. 30 shows experimental results from an optical position sensor, according to the present invention.

The relationship between the direct detector output and the current is shown in FIG. 29. Importantly, the detector output is proportional to the optical power falling on it. Using the least-squares fit in FIG. 29, one can compute the detector output for the values of current in FIG. 28 and plot the fluorescence output as a function of it. The result is FIG. 30, which, through a series of unknown constants of proportionality, yields a measure of the fluorescence power generated at a given point in the fiber as a function of the excitation power absorbed. We see no tendency toward saturation over this range of excitation power.

The particular examples and embodiments discussed above are cited to illustrate particular embodiments of the invention. Other applications and embodiments, of the apparatus and method of the present invention will become evident to those skilled in the art.

For example, the fluorescent waveguide may be doped with a non-uniform variation in the concentration of fluorescers along the length of the waveguide (e.g., a linear gradient). In this case, when the waveguide is exposed to an external excitation source that is uniformly distributed along the length of the waveguide (e.g., sunlight, room light), then a non-uniform distribution of fluorescent light will be generated inside of the waveguide. Fluorescent light emitted radially from the waveguide can be measured by a side-facing photodetector, whose position can be uniquely correlated to the intensity of emitted florescent light, as described earlier.

Alternatively, a non-uniform variation in the concentration of fluorescers along the length of the waveguide may be created by using a mask to shield portions of a uniformly doped waveguide.

It is to be generally understood that measurements of the position of an object taken over a period of time by the various embodiments of the fluorescent optical position sensor of the present invention, may be analyzed to compute various first and second derivatives of the position, X, versus time to generate velocity and acceleration information, as is well-known in the art.

The scope of the invention is defined by the claims appended hereto.

What is claimed is:

1. A fluorescent optical position sensor, comprising:
a fluorescent optical waveguide comprising a uniform concentration of fluorescent material along the waveguide's length;
means for generating a non-uniform distribution of fluorescent light inside of the waveguide;
photodetector means for measuring fluorescent light emitted from the waveguide;
wherein said photodetector means comprises a first photodetector disposed for measuring a first intensity of light, $S_1$, emitted from a proximal end of the waveguide, and a second photodetector disposed for measuring a second intensity of light, $S_2$, emitted from a distal end of the waveguide; and
processing means, in operative association with the first and second photodetectors, for calculating the location, X, of a position along the waveguide, based on the ratio, $S_1/S_2$, of the first and second intensities of fluorescent light emitted from the ends of the waveguide, as measured by the first and second photodetectors, respectively; as calculated according to the following formula:

$$X = \frac{L}{2} - \frac{1}{2\alpha}\ln(S_1/S_2)$$

where:
L=length of the waveguide;
α=0.23 B,
and B=Fiber Attenuation Coefficient (in db/meter);
wherein said first and second photodetectors are remotely located and are coupled to the ends of the fluorescent waveguide via first and second low-loss optical fibers, respectively; and further wherein an excitation means for exciting a localized region of fluorescence inside of the waveguide at an unknown position, X, comprises the proximal end of a third low-loss optical fiber held in close proximity by a support to said waveguide and oriented to illuminate the waveguide from the side; and wherein the distal end of the third optical fiber is coupled to a remotely-located excitation light source.

2. The sensor of claim 1, wherein the fluorescent optical waveguide comprises a fluorescent optical fiber wrapped in a helical pattern around a cylindrical core.

3. The sensor of claim 1, wherein the optical properties of the fluorescent optical waveguide comprise an optical absorption/excitation spectrum and an emission/fluorescence spectrum that do not significantly overlap.

4. A fluorescent optical position sensor, comprising:
a fluorescent optical waveguide;
means for generating a non-uniform distribution of fluorescent light inside of the waveguide; and
photodetector means for measuring fluorescent light emitted from the waveguide;
wherein the fluorescent waveguide comprises a bundle of fluorescent optical fibers contained within a tubular housing; wherein said tubular housing comprises a reflective interior surface and a transparent window for providing optical access to the bundle of fibers contained therein.

5. A fluorescent optical position sensor, comprising:
a fluorescent optical waveguide;
means for generating a non-uniform distribution of fluorescent light inside of the waveguide; and
photodetector means for measuring fluorescent light emitted from the waveguide;
wherein the means for generating a non-uniform distribution of fluorescent light inside of the waveguide comprises a plurality of individual localized excitation sources disposed at various positions along the waveguide, wherein each excitation source comprises means for modulating the source at a unique frequency to allow discrimination between the various individual excitation sources by frequency filtering the photodetector means output; and further comprising
means for filtering out low frequency signals caused by one or more source of unwanted ambient light selected from the group consisting of sunlight and fluorescent lights.

6. A fluorescent optical position sensor, comprising:
a fluorescent optical waveguide;
means for generating a non-uniform distribution of fluorescent light inside of the waveguide; and
photodetector means for measuring fluorescent light emitted from the waveguide;
wherein the waveguide comprises a solid, fluorescent disk surrounded by at least three photodetectors disposed around the outer circumference of the disk.

7. A fluorescent optical position sensor, comprising:
a fluorescent optical waveguide;
means for generating a non-uniform distribution of fluorescent light inside of the waveguide; and
photodetector means for measuring fluorescent light emitted from the waveguide;
wherein the means for generating a non-uniform distribution of fluorescent light inside of the waveguide comprises an excitation light source coupled to the proximal end of the waveguide, and wherein the photodetector means comprises a movable photodetector located at an axial position, X, for measuring fluorescent light emitted radially outwards from the waveguide at said axial position.

8. The sensor of claim 7, further comprising processing means, in operative association with said photodetector means, for calculating the axial location, X, of a position, relative to the waveguide, by analyzing an amount of fluorescent light measured by the photodetector means.

9. The sensor of claim 7, wherein the waveguide comprises an optical fiber doped with a uniform concentration of fluorescers along the fiber's length.

10. The sensor of claim 7, further comprising a low-loss, non-fluorescent optical waveguide oriented parallel to the fluorescent waveguide, and further comprising reflector means, attached to the distal ends of both the fluorescent and non-fluorescent waveguides, for reflecting the fluorescent light emitted from the distal end of the fluorescent waveguide back into the low-loss, non-fluorescent optical waveguide, where it is carried to a photodetector coupled to the proximal end of the low-loss, non-fluorescent optical waveguide.

11. The sensor of claim 7, wherein said movable photodetector comprises a ring photodetector that surrounds the waveguide.

12. The sensor of claim 11, wherein the ring photodetector comprises a loop of optical fiber doped with a second fluorescent material that is excited by the fluorescent light emitted by the waveguide when excited.

13. The sensor of claim 7, further comprising a reference photodetector fixed at a stationary position along the waveguide, for providing a reference light intensity signal.

14. The sensor of claim 13, wherein said reference photodetector is fixed close to the proximal end of the waveguide.

15. The sensor of claim 14, wherein said reference photodetector comprises a ring photodetector that surrounds the waveguide.

16. A vernier fluorescent optical position sensor, comprising:
a base fluorescent optical fiber;
a vernier fluorescent optical fiber oriented parallel to, and closely spaced to, the base fiber;
a movable, side-pumped excitation light source disposed for exciting a localized region of fluorescence inside of the waveguide at an unknown position, X; and
a first photodetector disposed for measuring a first intensity of light, $S_1$, emitted from a proximal end of the base fiber;
a second photodetector disposed for measuring a second intensity of light, $S_2$, emitted from a distal end of the base fiber;
a third photodetector disposed for measuring a third intensity of light, $S_3$, emitted from a proximal end of the vernier fiber; and
a fourth photodetector disposed for measuring a fourth intensity of light, $S_4$, emitted from a distal end of the vernier fiber;
wherein the extinction coefficient, $B_{base}$, of the base fiber is less than the extinction coefficient, $B_{vernier}$, of the vernier fiber.

17. An extended-range fluorescent optical position sensor, comprising:
a plurality of closely spaced, parallel-oriented optical fibers;
a movable, side-pumped excitation light source disposed for exciting a localized region of fluorescence inside of one or more optical fibers at an unknown axial position, X;
photodetector means for measuring fluorescent light emitted from the ends of each fiber; and
processing means for determining the position of the light source by analyzing the changes in light detected by the photodetector means caused by changes in the position of the light source, due to attenuation of the magnitude of the fluorescent light emitted by the localized region of fluorescence, said attenuation being caused by absorption of the fluorescent light within the fiber as it travels along the length of the fiber;

wherein each optical fiber comprises at least one section comprising a fluorescent material, and at least one adjacent section comprising a clear, non-fluorescent material;

wherein the fluorescent section on one fiber does not overlap the fluorescent section on an adjacent fiber.

18. A fluorescent optical position sensor, comprising:

a fluorescent optical waveguide comprising a uniform concentration of along the waveguide's length;

means for generating a non-uniform distribution of fluorescent light inside of the waveguide;

photodetector means for measuring fluorescent light emitted from the waveguide;

wherein said photodetector means comprises a first Photodetector disposed for measuring a first intensity of light, $S_1$, emitted from a proximal end of the waveguide, and a second photodetector disposed for measuring a second intensity of light, $S_2$, emitted from a distal end of the waveguide; and processing means, in operative association with the first and second photodetectors, for calculating the location, X, of a position along the waveguide, based on the ratio, $S_1/S_2$, of the first and second intensities of fluorescent light emitted from the ends of the waveguide, as measured by the first and second photodetectors, respectively; as calculated according to the following formula:

$$X = \frac{L}{2} - \frac{1}{2\alpha}\ln(S_1/S_2)$$

where:
L=length of the waveguide;
α=0.23 B,
and B=Fiber Attenuation Coefficient (in db/meter);
wherein the fluorescent waveguide comprises an optical fiber laid out in a two-dimensional double-spiral or serpentine pattern.

19. A method of determining the position along the length of a fluorescent optical waveguide, comprising:

a) providing a fluorescent optical waveguide having a first end, an opposing second end, and a one-dimensional curvilinear coordinate system having an origin at the said first end, and extending in a direction, x, pointing towards the second end; b) pumping excitation light into the first end of the waveguide, thereby exciting fluorescence inside the waveguide, wherein the intensity of fluorescence decays along the length of the waveguide due to conversion of the pump light into said fluorescent light;

c) placing a movable photodetector at an unknown position, X, along the length of the waveguide, positioned facing the side of the waveguide;

d) measuring with the side-facing photodetector an intensity of fluorescent light emitted radially outwards from the waveguide at that position; and e) calculating the position, X, of the side-facing photodetector by comparing the measured intensity of fluorescent light to a calibrated response curve or by using a suitable analytical expression.

20. The method of claim 19, wherein said waveguide comprises a uniform concentration of fluorescers.

21. The method of claim 20, wherein said photodetector comprises a ring photodetector that surrounds the waveguide.

22. A fluorescent optical position sensor, comprising:

a fluorescent optical waveguide having a non-uniform variation in the concentration of fluorescers along its length;

movable photodetector means disposed facing the side of the waveguide for measuring fluorescent light emitted radially outwards from the waveguide at an unknown position, X;

means for exposing the waveguide to a source of external excitation light that uniformly distributes said external excitation light along the length of the waveguide; and processing means for calculating the position, X, of the photodetector by comparing the measured intensity of fluorescent light to a calibrated response curve or by using a suitable analytical expression.

23. The sensor of claim 22, wherein the non-uniform variation in the concentration of fluorescers along its length comprises a linear gradient in said fluorescer concentration.

24. The sensor of claim 22, wherein the source of external excitation light comprises sunlight or room light.

* * * * *